US009363455B2

(12) United States Patent
Takeda

(10) Patent No.: US 9,363,455 B2
(45) Date of Patent: Jun. 7, 2016

(54) SOLID-STATE IMAGING DEVICE, ELECTRONIC DEVICE AND DRIVING METHOD THEREOF WITH SELECTIVE SECOND READING

(71) Applicant: Sony Corporation, Tokyo (JP)

(72) Inventor: Takeshi Takeda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 143 days.

(21) Appl. No.: 13/749,449

(22) Filed: Jan. 24, 2013

(65) Prior Publication Data
US 2013/0194472 A1  Aug. 1, 2013

(30) Foreign Application Priority Data

Feb. 1, 2012 (JP) ................................. 2012-019826

(51) Int. Cl.
    *H04N 5/374*  (2011.01)
    *H04N 5/355*  (2011.01)
    *H04N 5/3745* (2011.01)
    *H04N 5/359*  (2011.01)
(52) U.S. Cl.
    CPC ............. *H04N 5/374* (2013.01); *H04N 5/3559* (2013.01); *H04N 5/3594* (2013.01); *H04N 5/37452* (2013.01)
(58) Field of Classification Search
    CPC .. H04N 5/374; H04N 5/37452; H04N 5/3559
    USPC .......................................... 348/308, 234, 235
    See application file for complete search history.

(56) References Cited

U.S. PATENT DOCUMENTS

| 7,990,451 | B2 * | 8/2011 | Belenky et al. ............. 348/297 |
| 2007/0131991 | A1 * | 6/2007 | Sugawa ...................... 257/292 |
| 2008/0237446 | A1 * | 10/2008 | Oshikubo et al. ......... 250/208.1 |
| 2008/0266434 | A1 * | 10/2008 | Sugawa et al. ............. 348/308 |
| 2009/0045319 | A1 * | 2/2009 | Sugawa et al. ........... 250/208.1 |
| 2010/0026838 | A1 * | 2/2010 | Belenky et al. ........... 348/229.1 |
| 2010/0265373 | A1 * | 10/2010 | Tejada et al. .............. 348/297 |
| 2010/0277623 | A1 * | 11/2010 | Tejada et al. .............. 348/241 |
| 2011/0007196 | A1 * | 1/2011 | Yamashita et al. ......... 348/294 |
| 2011/0211103 | A1 * | 9/2011 | Sakano et al. ............. 348/308 |
| 2011/0234874 | A1 * | 9/2011 | Sato .......................... 348/301 |
| 2011/0285881 | A1 * | 11/2011 | Izuha et al. ................ 348/279 |

FOREIGN PATENT DOCUMENTS

JP   2011-199816   10/2011

* cited by examiner

*Primary Examiner* — Roberto Velez
*Assistant Examiner* — Abdelaaziz Tissire
(74) *Attorney, Agent, or Firm* — Chip Law Group

(57) ABSTRACT

There is provided a solid-state image pickup device including a pixel area in which a plurality of pixels are arranged. The pixels include an accumulation section accumulating a charge acquired by photoelectric conversion, a plurality of detection sections detecting the charge accumulated in the accumulation section, a connection separation control section controlling connection or separation of the detection sections, an output section outputting a first signal corresponding to a potential of each detection section in a separation state in which the connection separation control section separates the detection sections, or outputting a second signal corresponding to a potential of each detection section in a connection state in which the connection separation control section connects the detection sections, and an output selection section selecting whether to output the first signal from the output section or output the second signal from the output section, based on a value of the first signal.

19 Claims, 17 Drawing Sheets

FIG. 5
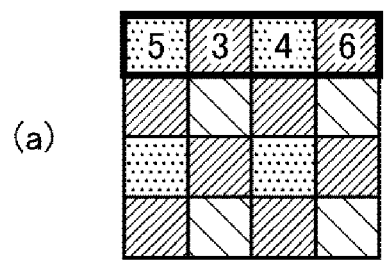
(a)
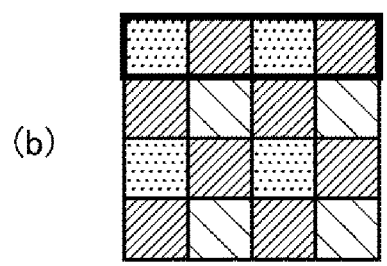
(b)
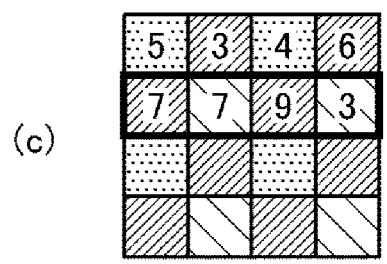
(c)
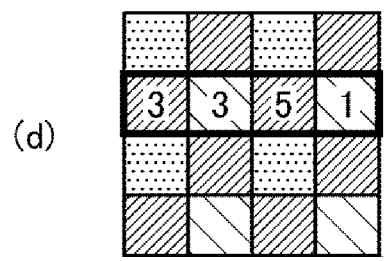
(d)

FIG. 7
(a) 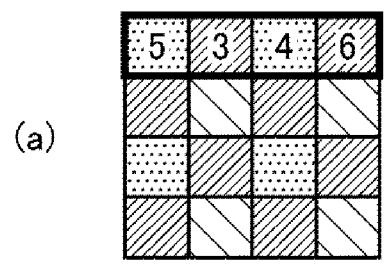
(b) 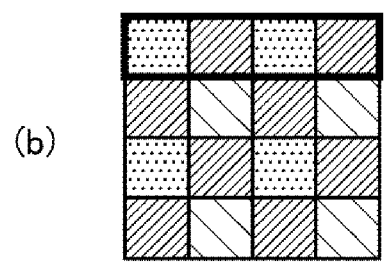
(c) 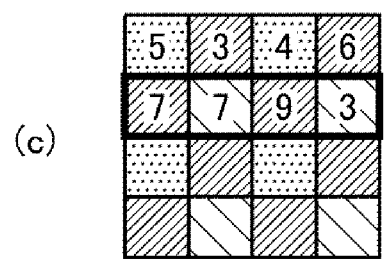
(d) 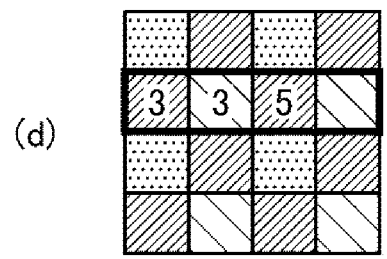

| 5 | 3 | 4 | 6 |
|---|---|---|---|
| 7 | 7 | 9 | 3 |
| 5 | 8 | 5 | 3 |
| 5 | 5 | 5 | 5 |

(b)

|   |   |   |   |
|---|---|---|---|
|   | 3 | 3 | 5 |
|   |   | 4 |   |
|   |   |   |   |

FIG. 14
(a) 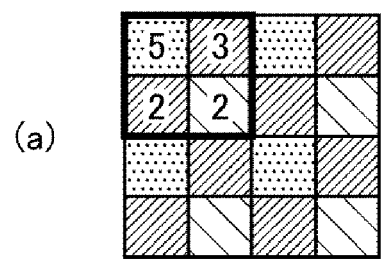
(b) 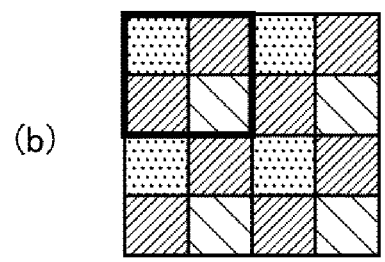
(c) 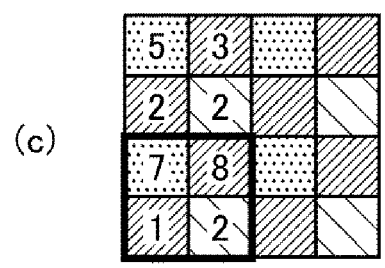
(d) 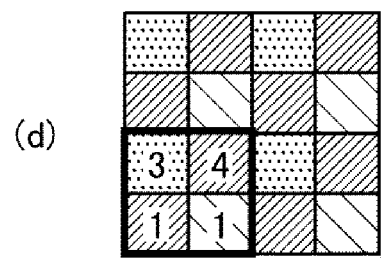

FIG. 15
(a) 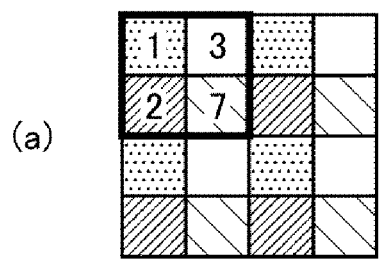
(b) 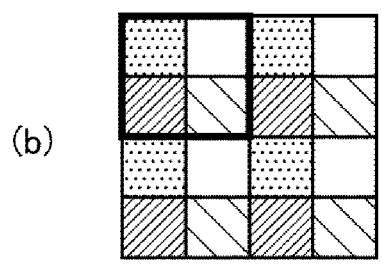
(c) 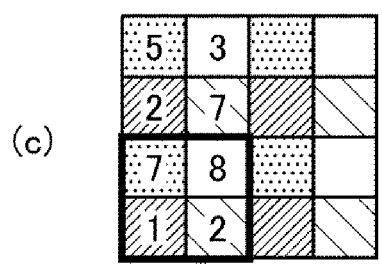
(d) 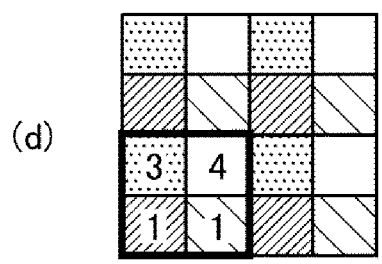

SOLID-STATE IMAGING DEVICE, ELECTRONIC DEVICE AND DRIVING METHOD THEREOF WITH SELECTIVE SECOND READING

BACKGROUND

The present disclosure relates to a solid-state imaging device, driving method and electronic device. In particular, the present disclosure relates to a solid-state imaging device, driving method and electronic device that can suppress power consumption in a device such as an image sensor without degrading image quality.

In recent years, on the ground of high-speed performance of the reading speed, replacement of CCDs with CMOS image sensors has been advanced. However, in the CMOS image sensors, the reading is generally performed every pixel in order, and therefore it is not possible to realize synchronism in the whole image.

That is, the CMOS image sensors perform an operation of sequentially scanning and reading light charges generated and accumulated in a photoelectric conversion portion every pixel or every row. In the case of this sequential scanning, that is, in the case of adopting a rolling shutter as an electronic shutter, it is not possible to share the exposure start time and exposure end time to accumulate light charges, in all pixels. Therefore, in the case of the sequential scanning, there is a problem that distortion is caused in a taken image at the time of taking an image of a moving subject.

In the case of taking an image of a subject that moves at high speed in which that kind of image distortion is not allowed, or in the case of the sensing use requesting synchronism in a taken image, a global shutter to execute the exposure start and the exposure end at the same timings with respect to all pixels in a pixel array portion is adopted as an electronic shutter.

A global shutter device, which is a device adopting the global shutter as an electronic shutter, includes, for example, a charge accumulation portion by a semiconductor memory in pixels. In the global shutter device, charges are concurrently transferred from a photodiode to a semiconductor memory, accumulated and sequentially read, so that synchronism in the whole image is maintained.

Also, there is suggested a device mounting a capacitor in addition to a semiconductor memory that accumulates charges to expand a dynamic range of an image sensor. In such a device, since it is possible to accumulate a large amount of charges by accumulating the charges in the capacitor, it is possible to improve the dynamic range and simultaneously realize image synchronism and the dynamic range improvement (for example, see Japanese Patent Laid-Open No. 2011-199816).

For example, in the case of Japanese Patent Laid-Open No. 2011-199816, two accumulation portions are provided. One is formed with a flush-mounted channel in a Si substrate and the other is formed with a capacitor.

The flush-mounted channel is formed under an SG part and has a feature that, since the possible accumulation capacity is small and the accumulation is performed in Si, it is less influenced by the interface state and the dark current is small. Meanwhile, the capacitor can accumulate a large amount of charges compared to the flush-mounted channel.

SUMMARY

However, although the capacitor can accumulate a large amount of charges, since they pass through a contact or trace joint part when being transferred from a photodiode to an accumulation portion, electrons are excited via the interface state of the interface and the dark current is likely to be caused.

To avoid this, for example, the technique of Japanese Patent Laid-Open No. 2011-199816 suggests that, at low illumination, charges are accumulated only in the flush-mounted channel, and, at high illumination, charges overflown from the flush-mounted channel are accumulated in the capacitor and the charges accumulated in both the flush-mounted channel and the capacitor are output at the time of reading.

However, by doing this, it is requested to read only the charges in the flush-mounted channel and read the charges accumulated in both the flush-mounted channel and the capacitor. That is, since accumulated charges are read twice from one pixel and a signal is output, the power consumption of a column processing portion, especially, the power consumption of a load MOS transistor increases.

The present disclosure is disclosed in view of the above state, and it is possible to suppress power consumption in a device such as an image sensor without degrading image quality.

According to a first embodiment of the present technology, there is provided a solid-state image pickup device including a pixel area in which a plurality of pixels are arranged. The plurality of pixels include an accumulation section accumulating a charge acquired by photoelectric conversion, a plurality of detection sections detecting the charge accumulated in the accumulation section, a connection separation control section controlling connection or separation of the plurality of detection sections, an output section outputting a first signal corresponding to a potential of each detection section in a separation state in which the connection separation control section separates the plurality of detection sections, or outputting a second signal corresponding to a potential of each detection section in a connection state in which the connection separation control section connects the plurality of detection sections, and an output selection section selecting whether to output the first signal from the output section or output the second signal from the output section, based on a value of the first signal.

The first signal may be output at low illumination and the second signal may be output at high illumination.

When the value of the first signal is equal to or greater than a threshold set in advance, the output selection section selects to output the second signal from the output section.

The output selection section selects whether to output the first signal or output the second signal, by controlling ON/OFF of a load MOS transistor of each pixel.

The output selection section selects whether to output the first signal or output the second signal, by controlling ON/OFF of a selection transistor of each pixel.

For each of the plurality of pixels arranged in a two-dimensional matrix manner in the pixel area, whether to output the first signal or output the second signal is selected on a per-row basis.

The solid-state image pickup device further including a memory storing the first signal value acquired from each of the plurality of pixels arranged in the pixel area. The selection section selects whether to output the first signal or output the second signal, from the output section of each pixel, based on the first signal value of each pixel stored in the memory.

The solid-state image pickup device further including a memory storing the first signal value acquired from a pixel arranged as a white pixel among the plurality of pixels arranged in the pixel area. The selection section selects whether to output the first signal or output the second signal, from the output section of each pixel in a predetermined area including the white pixel, based on the first signal value of each pixel stored in the memory.

According to a first embodiment of the present technology, there is provided a method for driving a solid-state image pickup device, the solid-state image pickup device including a pixel area in which a plurality of pixels are arranged. The plurality of pixels include an accumulation section accumulating a charge acquired by photoelectric conversion, a plurality of detection sections detecting the charge accumulated in the accumulation section, a connection separation control section controlling connection or separation of the plurality of detection sections, an output section outputting a first signal corresponding to a potential of each detection section in a separation state in which the connection separation control section separates the plurality of detection sections, or outputting a second signal corresponding to a potential of each detection section in a connection state in which the connection separation control section connects the plurality of detection sections, and an output selection section selecting whether to output the first signal from the output section or output the second signal from the output section, based on a value of the first signal. The method includes comparing the value of the first signal with a threshold set in advance, and outputting, when the value of the first signal is equal to or greater than the threshold set in advance, the second signal from the output section.

According to a second embodiment of the present technology, there is provided an electronic device including a solid-state image pickup device including a pixel area in which a plurality of pixels are arranged. The plurality of pixels include an accumulation section accumulating a charge acquired by photoelectric conversion, a plurality of detection sections detecting the charge accumulated in the accumulation section, a connection separation control section controlling connection or separation of the plurality of detection sections, an output section outputting a first signal corresponding to a potential of each detection section in a separation state in which the connection separation control section separates the plurality of detection sections, or outputting a second signal corresponding to a potential of the detection section in a connection state in which the connection separation control section connects the plurality of detection sections, an output selection section selecting whether to output the first signal from the output section or output the second signal from the output section, based on a value of the first signal.

In the embodiments of the present disclosure, in a pixel of a pixel area in which a plurality of pixels are arranged: charges acquired by photoelectric conversion are accumulated; the accumulated charges are detected; connection or separation of a plurality of detection portions is controlled; a first signal corresponding to the potential of the detection section in a separation state in which the plurality of detection sections are separated or a second signal corresponding to the potential of the detection section in a connection state in which the plurality of detection sections are connected is output; and whether to output the first signal or output the second signal is selected based on a value of the first signal.

According to an embodiment the present disclosure, it is possible to suppress power consumption in a device such as an image sensor without degrading image quality.

BRIEF DESCRIPTION OF THE DRAWINGS

FIG. 5 is a view illustrating processing of reading charges from unit pixels in the present disclosure;

FIG. 7 is a view for explaining another processing example of reading charges from unit pixels in the present disclosure;

FIG. 12 is a view for explaining another processing example of reading charges from unit pixels in the present disclosure;

FIG. 14 is a view for explaining another processing example of reading charges from unit pixels in the present disclosure;

FIG. 15 is a view for explaining another processing example of reading charges from unit pixels in the present disclosure;

DETAILED DESCRIPTION OF THE EMBODIMENT(S)

Figure 1:
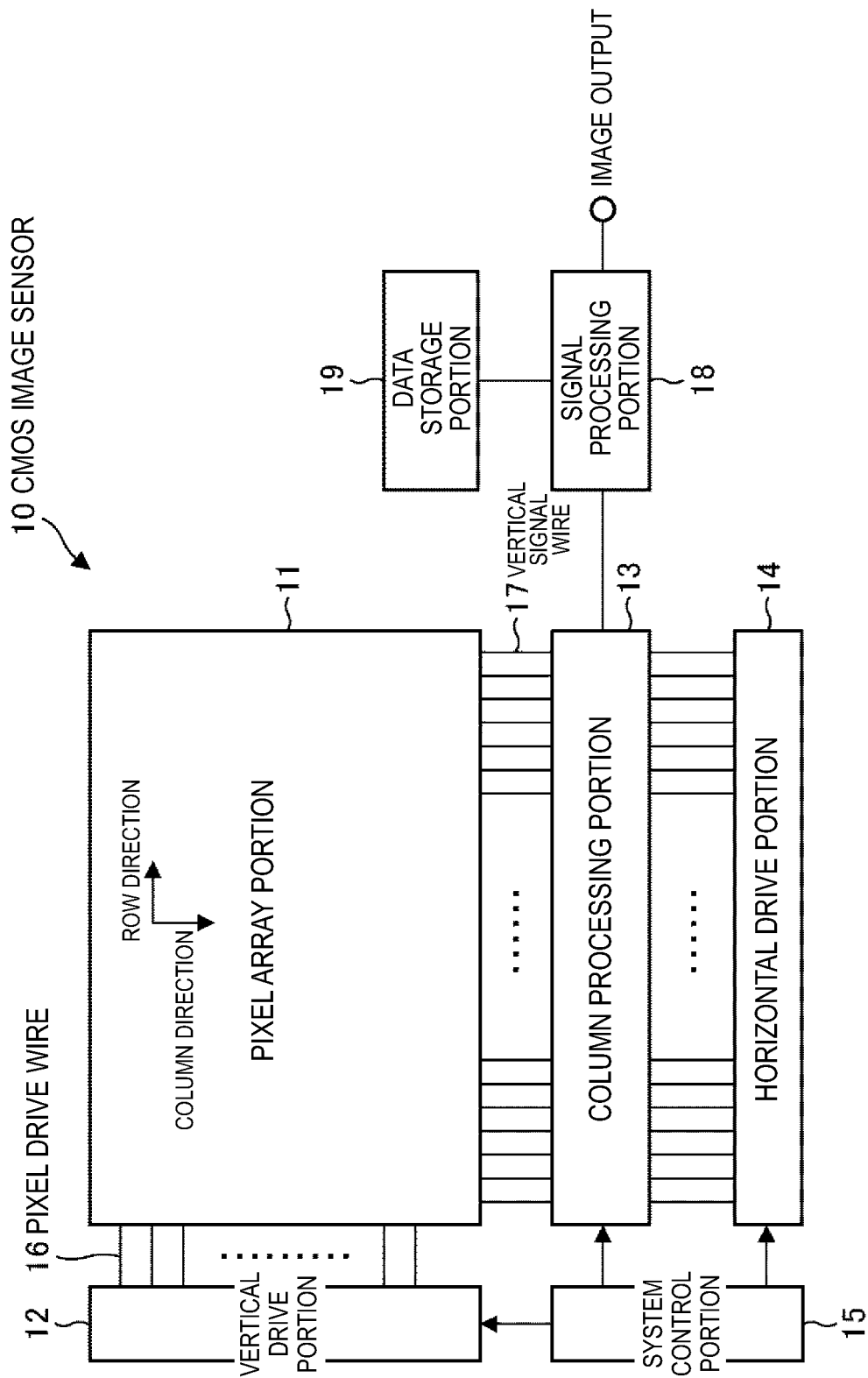
FIG. 1 is a block diagram illustrating a configuration example according to an embodiment of a CMOS image sensor to which the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

FIG. 1 is a block diagram illustrating a configuration example according to an embodiment of a solid-state imaging device to which the present disclosure is applied, such as a CMOS image sensor which is a kind of solid-state imaging device of an X-Y addressing scheme. Here, the CMOS image sensor is an image sensor created by applying CMOS process or using part of it.

A CMOS image sensor 10 in this example has a configuration including a pixel array portion 11 formed on a semiconductor substrate (i.e. chip) (not illustrated) and peripheral circuit portions collected on the same semiconductor substrate as that of the pixel array portion 11. The peripheral circuit portions include, for example, a vertical drive portion 12, a column processing portion 13, a horizontal drive portion 14 and a system control portion 15.

The CMOS image sensor 10 further includes a signal processing portion 18 and a data storage portion 19. The signal processing portion 18 and the data storage portion 19 may be mounted on the same substrate as that of the CMOS image sensor 10 or arranged on a different substrate from that of the CMOS image sensor 10. Also, each processing in the signal processing portion 18 and the data storage portion 19 may be controlled by software or an external signal processing portion set on a different substrate from that of the CMOS image sensor 10, such as a DSP (Digital Signal Processor) circuit.

The pixel array portion 11 has a configuration in which unit pixels (which may be simply referred to as "pixels" below) having a photoelectric conversion portion that generates and accumulates light charges based on a quantity of received light are arranged in a two-dimensional manner in the row and column directions (i.e. in a matrix manner). Here, the row direction denotes the pixel arrangement direction of pixel rows (i.e. horizontal direction) and the column direction denotes the pixel arrangement direction of pixel columns (i.e. vertical direction). A unit pixel configuration will be described later in detail.

In the pixel array portion 11, a pixel drive wire 16 is wired along the row direction every pixel row and a vertical signal wire 17 is wired along the column direction every pixel column, in the matrix pixel arrangement. The pixel drive wire 16 transmits a drive signal that performs driving at the time of reading a signal from a pixel. Although FIG. 1 illustrates the pixel drive wire 16 as one wire, it is not limited to one wire. One end of the pixel drive wire 16 is connected to the output terminal corresponding to each row of the vertical drive portion 12.

The vertical drive portion 12 is configured with a shift register, an address decoder and so on, and drives all pixels of the pixel array portion 11 at the same time or drives the pixels of the pixel array portion 11 in a row unit. That is, the vertical drive portion 12 and the system control portion 15 to control the vertical drive portion 12 form a drive portion to drive each pixel of the pixel array portion 11. Although illustration of a specific configuration of this vertical drive portion 12 is omitted, it generally has a configuration including two scanning systems of a reading scanning system and a sweeping scanning system.

The reading scanning system selectively and sequentially scans unit pixels of the pixel array portion 11 in row units to read signals from the unit pixels. The signal read from the unit pixel is an analog signal. The sweeping scanning system performs sweeping scanning with respect to the reading rows subjected to reading scanning in the reading scanning system, earlier than the reading scanning by the time of the shutter speed.

By the sweeping scanning in this sweeping scanning system, unnecessary charges are swept from a photoelectric conversion portion of the unit pixel of a reading row and therefore the photoelectric conversion portion is reset. Subsequently, by the sweeping (resetting) of unnecessary charges in this sweeping scanning system, a so-called electronic shutter operation is performed. Here, the electronic shutter operation denotes an operation of discarding light charges of photoelectric conversion portions and starting an exposure (i.e. starting an accumulation of light charges) anew.

A signal read by the reading operation in the reading scanning system corresponds to the quantity of light received after the previous reading operation or electronic shutter operation. Subsequently, a period between the reading timing by the previous reading operation or the sweeping timing by the electronic shutter operation and the reading timing of the current reading operation is an exposure period of light charges in unit pixels.

The signal output from each unit pixel of the pixel row selectively scanned by the vertical drive portion 12 is input in the column processing portion 13 via each vertical signal wire 17 every pixel column. The column processing portion 13 performs predetermined signal processing on the signal output from each pixel of a selected row via the vertical signal wire 17, every pixel column of the pixel array portion 11, and temporarily holds the pixel signal after the signal processing.

To be more specific, as signal processing, the column processing portion 13 performs at least noise removal processing such as CDS (Correlated Double Sampling) processing. The CDS processing by this column processing portion 13 removes reset noise or fixed pattern noise unique to pixels such as threshold variation of amplification transistors in pixels. In addition to the noise removal processing, for example, the column processing portion 13 can have an AD (analog-to-Digital) conversion function so as to convert an analog pixel signal into a digital signal and output it.

Also, in the column processing portion 13, as described later, a threshold comparison circuit is set.

The horizontal drive portion 14 includes a shift register, an address decoder and so on, and selects unit circuits corresponding to the pixel columns of the column processing portion 13 in order. By the selective scanning in this horizontal drive portion 14, pixel signals subjected to signal processing every unit circuit in the column processing portion 13 are output in order.

The system control portion 15 includes a timing generator to generate various timing signals and performs drive control of the vertical drive portion 12, the column processing portion 13 and the horizontal drive portion 14 based on the various timings generated in the timing generator.

The signal processing portion 18 has at least a computation processing function and performs various kinds of signal processing such as computation processing on a pixel signal output from the column processing portion 13. In preparation for signal processing in the signal processing portion 18, the data storage portion 19 temporarily stores data requested in the processing.

The CMOS image sensor 10 having the above configuration adopts a global exposure to execute the exposure start and the exposure end at the same timings with respect to all pixels in the pixel array portion 11. This global exposure is executed under the driving by the drive portion formed with the vertical drive portion 12 and the system control portion 15. The global shutter function that realizes the global exposure is a shutter operation suitable for the case of taking an image of a subject that moves at high speed or the case of the sensing use requesting synchronism in a taken image.

To realize the global exposure, compared to the related art that realizes the global exposure, the CMOS image sensor 10 has two charge accumulation portions in a unit pixel to maintain a larger saturated charge amount without degrading image quality of a taken image at dark situation or low illumination. Subsequently, in the two charge accumulation portions, for example, a flush-mounted MOS capacitor is used as a first charge accumulation portion and a capacitor of a larger capacity value per unit area than that of the first charge accumulation portion (for example, planar-type MOS capacitor) is used as a second charge accumulation portion.

Preferably, regarding the first charge accumulation portion and the second charge accumulation portion, the amount relationship of saturated charge amounts is set as follows. That is, regarding the first charge accumulation portion, it is preferable that the saturated charge amount is smaller than the saturated charge amount of the photoelectric conversion portion.

When the saturated charge amount of the first charge accumulation portion is made smaller than the saturated charge amount of the photoelectric conversion portion, the reduced amount is compensated in the second charge accumulation portion. Therefore, a sum of the saturated charge amount of the second charge accumulation portion and the saturated charge amount of the first charge accumulation portion is requested to be equal to or larger than the saturated charge amount of the photoelectric conversion portion.

By this means, it is possible to acquire the following operational effects.

That is, compared to a case where a flush-mounted MOS capacitor is formed on the same area as an area combining the first charge accumulation portion and the second charge accumulation portion, it is possible to largely increase the value of capacity in which it is possible to accumulate light charges, that is, it is possible to maintain a larger saturated charge amount. Further, by using a flush-mounted MOS capacitor, signals at low illumination are less influenced by the interface state and defection, and, compared to the related art that realizes the global exposure, since dark-situation characteristics are not degraded, the image quality of taken images at low illumination is not degraded.

As a result of this, for example, it is possible to realize a CMOS image sensor having a global shutter function that fulfills performance equivalent to that of a CMOS image sensor without the global shutter function of the identical unit pixel size. Also, for example, compared to a CMOS image sensor having the global shutter function of the identical unit pixel size in the related art, it is possible to largely expand the dynamic range.

Thus, by using the flush-mounted MOS capacitor as the first charge accumulation portion and the capacitor of a larger capacity value per unit area than that of the first charge accumulation portion as the second charge accumulation portion, it is possible to increase the total capacity value of the charge accumulation portions. However, since a capacitor of a larger capacity value per unit area has much leakage current as a whole, by the second charge accumulation unit, degradation of dark-situation characteristics such as dark current and white spot may become significant.

Therefore, when light charges are transferred from the photoelectric conversion portion for all pixels at the same time, light charges at low luminance are accumulated in the first charge accumulation portion. Here, the "light charges at low luminance" means light charges equal to or smaller than the saturated charge amount of the first charge accumulation portion. As described above, since the first charge accumulation portion is formed with the flush-mounted capacitor, it is less influenced by the interface state and defection and therefore has better dark (or low-illumination) characteristics than the second charge accumulation portion.

Also, light charges at high illumination are accumulated in both the first charge accumulation portion and the second charge accumulation portion. Here, the "light charges at high illumination" mean light charges over the saturated charge amount of the first charge accumulation portion. At high illumination at which a treated charge amount is large, since high S/N is maintained, there is less influence of dark-situation characteristics such as dark current and white spot. Therefore, even if light charges at high illumination are accumulated in the second charge accumulation portion in which there is a large leakage current, there is extremely less influence on image quality.

As clear from the above explanation, by using the flush-mounted MOS capacitor as the first charge accumulation portion and the capacitor of a larger capacity value per unit area than that of the first charge accumulation portion as the second charge accumulation portion, it is possible to maintain a larger saturated charge amount and reduce the unit pixel size by the saved space.

Further, at the time of simultaneously reading all pixels, light charges at low illumination are accumulated in the first charge accumulation portion of good dark-situation characteristics such as dark current and white spot, while light charges at high illumination are accumulated in the second charge accumulation portion of poor dark-situation characteristics. Therefore, image quality of taken images at low illumination is not degraded.

Figure 2:
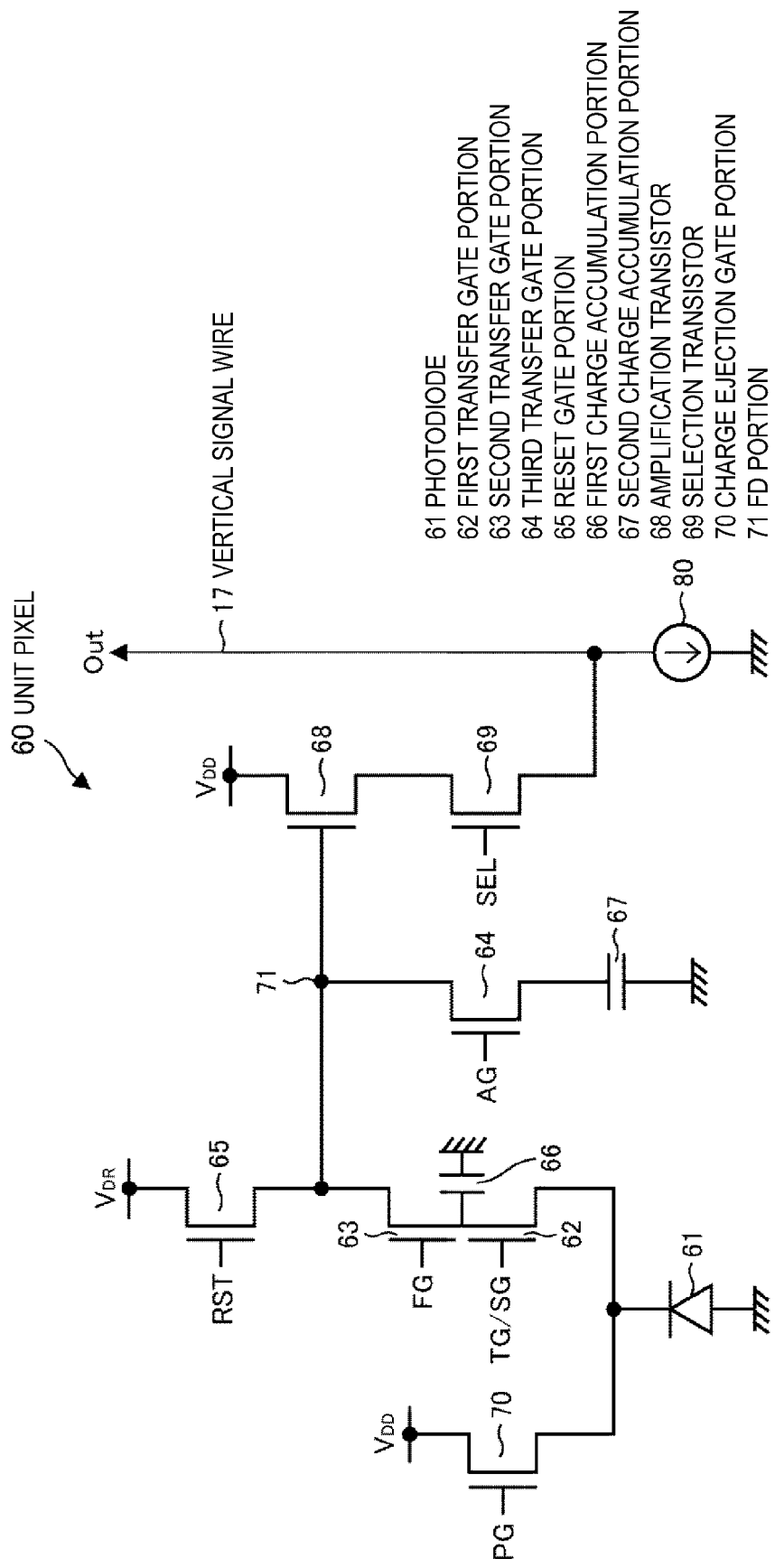
FIG. 2 is a circuit view illustrating a circuit configuration of a unit pixel arranged in a pixel array in FIG. 1.

FIG. 2 is a circuit view illustrating a circuit configuration of a unit pixel 60 arranged in a pixel array portion 11 in FIG. 1. As illustrated in FIG. 2, the unit pixel 60 has, for example, a p-n junction photodiode 61 as a photoelectric conversion portion that receives light and generates and accumulates light charges. The photodiode 61 generates and accumulates light charges based on a quantity of received light.

Further, for example, the unit pixel 60 includes a first transfer gate portion 62, a second transfer gate portion 63, a third transfer gate portion 64, a reset gate portion 65, a first charge accumulation portion 66 and a second charge accumulation portion 67. Further, the unit pixel 60 includes an amplification transistor 68, a selection transistor 69 and a charge ejection gate portion 70.

In the unit pixel 60 having the above configuration, the first charge accumulation portion 66 and the second charge accumulation portion 67 correspond to the first charge accumulation portion and the second charge accumulation portion described above. That is, the first charge accumulation portion 66 is formed with a flush-mounted MOS capacitor. The second charge accumulation portion 67 is formed with a capacitor of a larger capacity value per unit area than that of the first charge accumulation portion 66.

In the unit pixel 60, a plurality of drive wires are wired every pixel row, for example, as the pixel drive wire 16 in FIG. 1. Also, through the plurality of drive wires of the pixel drive wire 16 from the vertical drive portion 12 in FIG. 1, various drive signals TG, FG, AG, RST, SEL and PG are supplied. These drive signals TG FG, AG, RST, SEL and PG are pulse signals in which the high-level (for example, source voltage VDD) state is an active state and the low-level state (for example, negative potential) is an inactive state. Also, it is assumed that the drive signal TG can be adequately driven at three values of the high-level potential, the low level potential and the intermediate-level potential therebetween. In the following, the intermediate-level potential is referred to as intermediate potential VM.

The drive signal TG is applied to a gate electrode of the first transfer gate portion 62 as a transfer signal. In the following, the drive signal TG may be adequately referred to as transfer signal TG. In the first transfer gate portion 62, one source/drain area is connected to the photodiode 61. When the drive signal TG gets in an active state, in response to this, the first transfer gate portion 62 gets in a conduction state. By this means, light charges accumulated in the photodiode 61 are transferred to the first charge accumulation portion 66. The light charges transferred by the first transfer gate portion 62 are temporarily accumulated in the first charge accumulation portion 66.

The drive signal FG is applied to a gate electrode of the second transfer gate portion 63 as a transfer signal. In the following, the drive signal FG may be adequately referred to as transfer signal FG. In the second transfer gate portion 63, one source/drain area is connected to a floating diffusion portion (hereinafter referred to as "FD portion") 71 to which a gate electrode of the amplification transistor 68 is connected. The FD portion 71 converts light charges into electric signals such as voltage signals and outputs these. When the drive signal FG gets in an active state, in response to this, the second transfer gate portion 63 gets in a conduction state. By this means, the light charges accumulated in the first charge accumulation portion 66 are transferred to the FD portion 71.

The drive signal AG is applied to a gate electrode of the third transfer gate portion 64 as a transfer signal. In the following, the drive signal AG may be adequately referred to as transfer signal AG. In the third transfer gate portion 64, one source/drain area is connected to the FD portion 71. When the drive signal AF gets in an active state, in response to this, the third transfer gate portion 64 gets in a conduction state. By this means, the potentials of the FD portion 71 and the second charge accumulation portion 67 are combined. Further, when the drive signal AG gets in an inactive state, in response to this, the third transfer gate portion 64 gets in a non-conduction state and therefore the potentials of the FD portion 71 and the second charge accumulation portion 67 are divided.

The drive signal RST is applied to a gate electrode of the reset gate portion 65 as a reset signal. In the following, the reset signal TG may be adequately referred to as reset signal RST. In the reset gate portion 65, one source/drain area is connected to the reset voltage VDR and the other source/drain area is connected to the FD portion 71. When the drive signal RST gets in an active state, in response to this, the reset gate portion 65 gets in a conduction state. By this means, the potential of the FD portion 71 is reset to the level of the voltage VDR.

In the amplification transistor 68, the gate electrode is connected to the FD portion 71 and the drain electrode is connected to the source voltage VDD, so as to be an input portion of a reading circuit that reads light charges acquired by the photoelectric conversion in the photodiode 61, which is a so-called source follower circuit. That is, in the amplification transistor 68, the source electrode is connected to the vertical signal wire 17 via the selection transistor 69 such that the amplification transistor 68 and a constant current source 80 connected to one end of the vertical signal wire 17 form a source follower circuit.

The drive signal SEL is applied to a gate electrode of the selection transistor 69 as a selection signal. In the following, the drive signal SEL may be adequately referred to as selection signal SEL. The selection transistor 69 is connected between the source electrode of the amplification transistor 68 and the vertical signal wire 17. Also, when the drive signal SEL gets in an active state, in response to this, the selection transistor 69 gets in a conduction state. By this means, with the unit pixel 60 as a selection state, a pixel signal output from the amplification transistor 68 is output to the vertical signal wire 17.

The drive signal PG is applied to a gate electrode of the charge ejection gate portion 70 as a charge ejection control signal. In the following, the drive signal PG may be adequately referred to as charge ejection control signal PG. The charge ejection gate portion 70 is connected between the photodiode 61 and a charge ejection portion (for example, source voltage VDD). When the drive signal PG gets in an active state, in response to this, the charge ejection gate portion 70 gets in a conduction state. By this means, a predetermined amount of light charges defined in advance from the photodiode 61 or all light charges accumulated in the photodiode 61 is selectively ejected to the charge ejection portion.

By making the charge ejection gate portion 70 get in a conduction state in a period in which light charges are not accumulated, it is possible to prevent charges over the saturated charge amount of the photodiode 61 from overflowing into the first charge accumulation portion 66, the second charge accumulation portion 66 and peripheral pixels.

Figure 3:
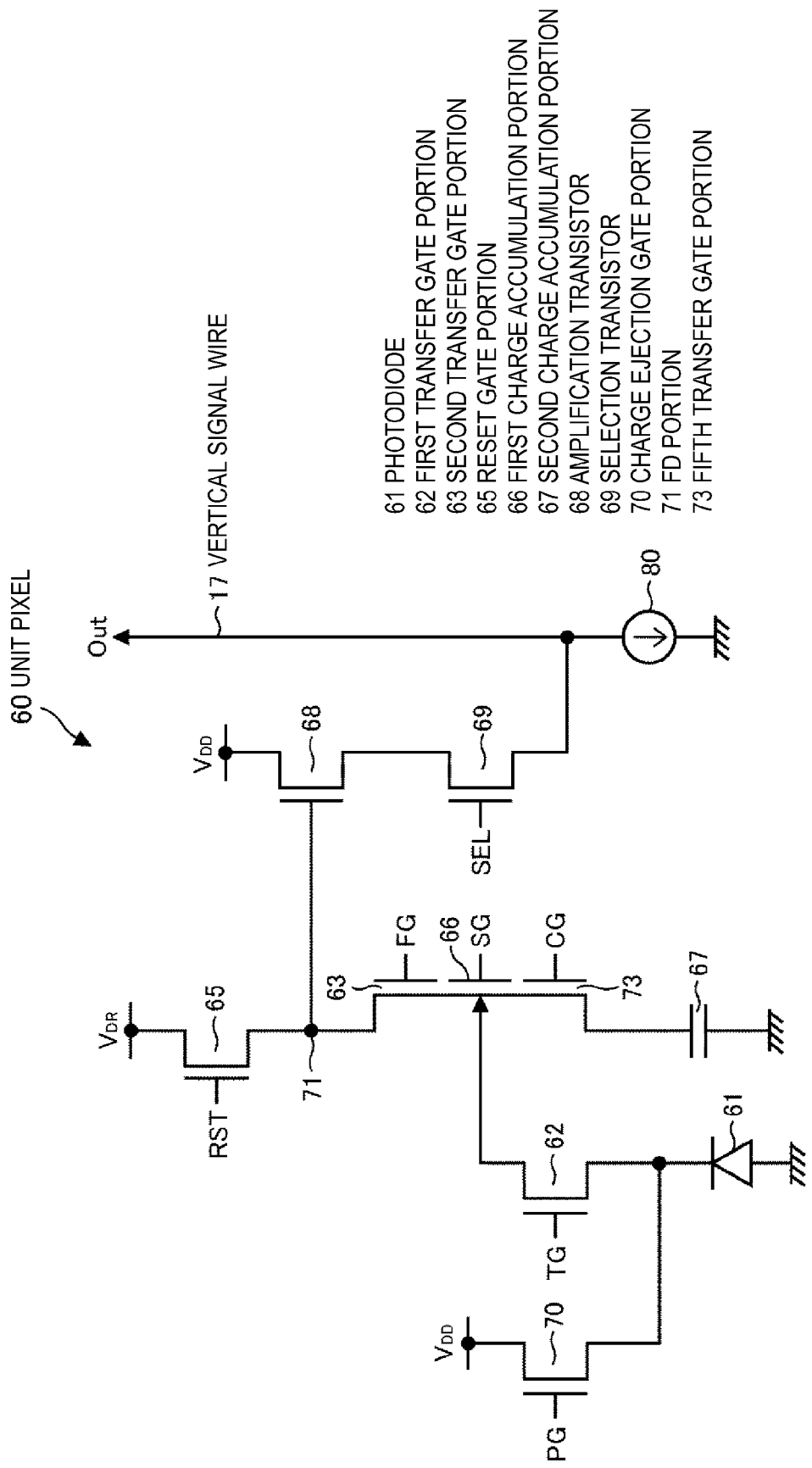
FIG. 3 is a circuit view illustrating another circuit configuration of a unit pixel arranged in the pixel array in FIG. 1.

Also, a unit pixel arranged in the pixel array portion 11 in FIG. 1 may be configured as illustrated in FIG. 3. FIG. 3 is a circuit view illustrating another circuit configuration of the unit pixel 60 arranged in the pixel array portion 11 in FIG. 1, and, in FIG. 3, the same reference numerals are assigned to the same portions as in FIG. 2.

As illustrated in FIG. 3, in this example, the following components are provided in addition to the photodiode 61. That is, the unit pixel 60 in FIG. 3 includes the first transfer gate portion 62, the second transfer gate portion 63, the reset gate portion 65, the first charge accumulation portion 66 and the second charge accumulation portion 67. Further, the unit pixel 60 in FIG. 3 includes the amplification transistor 68, the selection transistor 69, the charge ejection gate portion 70 and a fifth transfer gate portion 73.

In the unit pixel 60 in FIG. 3, the first charge accumulation portion 66 is set as a flush-mounted MOS capacitor between the first transfer gate portion 62 and the second transfer gate portion 63 in the circuit. In a gate electrode of the charge accumulation portion 66, a drive signal SG is applied as a transfer signal. In the following, the drive signal SG may be adequately referred to as transfer signal SG. Similar to the case of FIG. 2, the second charge accumulation portion 67 is formed with a capacitor of a larger capacity value per unit area than that of the charge accumulation portion 66.

The first transfer gate portion 62 is connected between the photodiode 61 and the first charge accumulation portion 66 in the circuit. The second transfer gate portion 63 is connected between the charge accumulation portion 66 and the FD portion 71 in the circuit. The fifth transfer gate portion 73 is connected between the charge accumulation portion 66 and the second charge accumulation portion 67 in the circuit. In a gate electrode of the fifth transfer gate portion 73, a drive signal CG is applied as a transfer signal. In the following, the drive signal CG may be adequately referred to as transfer signal CG.

The circuit connection relationships of other components than the first transfer gate portion 62, the second transfer gate portion 63, the fifth transfer gate portion 73, the first charge accumulation portion 66 and the second charge accumulation portion 67, are the same as in the case of FIG. 2.

Figure 4:
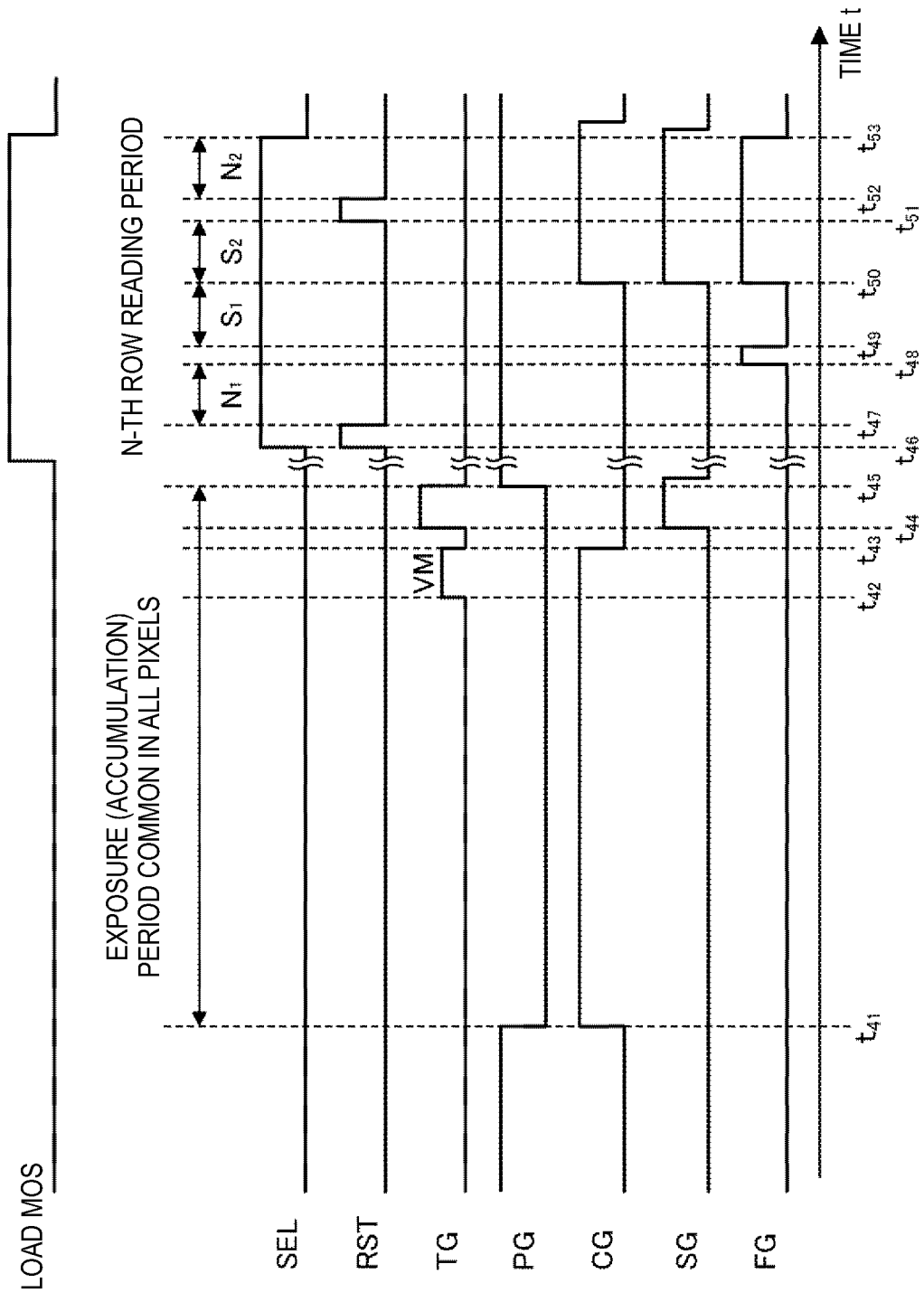
FIG. 4 is a timing chart for explaining circuit operations of the unit pixel in FIG. 3.

FIG. 4 is a timing chart for explaining circuit operations of the unit pixel 60 in FIG. 3. FIG. 4 illustrates the timing relationships of the selection signal SEL, the reset signal RST, the transfer signal TG the charge ejection control signal PG the transfer signal CG, the transfer signal SG and the transfer signal FG. Also, in addition to these signals, it illustrates the timing relationship of a load MOS transistor drive signal which will be described later.

First, at time t41, the charge ejection control signal PG gets in an inactive state in all pixels at the same time and the charge ejection gate portion 70 gets in a non-conduction state, such that an exposure period common in all pixels is set. At time t41, the transfer signal CG gets in an active state at the same time and therefore the fifth transfer gate portion 73 gets in a conduction state.

In the exposure period, in the case of high illumination, in addition to the photodiode 61, light charges overflown from the photodiode 61 are accumulated in the first charge accumulation portion 66 via an overflow path of the first transfer gate portion 62. Further, since the fifth transfer gate portion 73 is in a conduction state, the light charges overflown from the charge accumulation portion 66 are accumulated in the second charge accumulation portion 67 too via the fifth transfer gate portion 73. In the case of low illumination, light charges are accumulated only in the photodiode 61.

Next, at time t42, by driving the transfer signal TG at the intermediate potential VM, light charges from the photodiode 61 over a predetermined charge amount determined by the intermediate potential VM are accumulated in the first charge accumulation portion 66 and the second charge accumulation portion 67 via the first transfer gate portion 62. The predetermined charge amount herein denotes the saturated charge amount of the first charge accumulation portion 66. By this means, at the next operation, that is, when the second transfer gate portion 63 becomes a non-conduction state and light charges accumulated in the photodiode 61 are transferred to the charge accumulation portion 66, the light charges are prevented from overflowing from the first charge accumulation portion 66.

Next, at time t43, when the transfer signal CG gets in an inactive state, the fifth transfer gate portion 73 gets in a non-conduction state.

Subsequently, at time t44, when the transfer signal TG and the transfer signal SG get in an active state in all pixels at the same time, the gate electrodes of the first transfer gate portion 62 and the first charge accumulation portion 66 get in a conduction state. By this means, the light charges accumulated in the photodiode 61 are transferred to the charge accumulation portion 66 and accumulated in the charge accumulation portion 66.

Next, at time t45, the transfer signal TG gets in an inactive state in all pixels at the same time while the charge ejection control signal PG gets in an active state, and the first transfer gate portion 62 gets in a non-conduction state. Also, at the same time, the charge ejection gate portion 70 gets in a conduction state. By this means, the exposure period common in all pixels is finished and the transfer signal SG gets in an inactive state.

At this time, light charges at high illumination are accumulated in both the first charge accumulation portion 66 and the second charge accumulation portion 67. Light charges at low illumination are accumulated only in the first charge accumulation portion 66.

Next, the selection signal SEL of the N-th row gets in an active state at time t46 and the selection transistor 69 of the N-th row gets in a conduction state, and thereby the unit pixel 60 of the N-th row gets in a selection state. At the same time, the reset signal RST gets in an active state, the reset gate portion 65 gets in a conduction state and thereby the FD portion 71 is reset. Subsequently, at time t47 at which the reset signal RST gets in an inactive state, the potential of the FD portion 71 is output as reset level N1 to the vertical signal wire 17 through the amplification transistor 68 and the selection transistor 69.

Next, when the transfer signal FG gets in an active state at time t48, the second transfer gate portion 63 gets in a conduction state and the light charges accumulated in the first charge accumulation are transferred to the FD portion 71. This light charge transfer is performed until time t49 at which the transfer signal FG gets in an inactive state.

Subsequently, the potential of the FD portion 71 at time t49 at which the light charge transfer is finished is output, as a first signal level S1 based on the accumulated charge amount of the first charge accumulation portion 66, to the vertical signal wire 17 through the amplification transistor 68 and the selection transistor 69.

Next, when the transfer signal CG; the transfer signal SG and the transfer signal FG simultaneously get in an active state at time t50, the fifth transfer gate portion 73, the gate electrode of the first charge accumulation portion 66 and the second transfer gate portion 63 get in a conduction state together. By this means, the FD portion 71, the first charge accumulation portion 66 and the second charge accumulation portion 67 are combined and therefore light charges are accumulated in the overall combined area. Also, these light charges are output as a second signal level S2 to the vertical signal wire 17 through the amplification transistor 68 and the selection transistor 69.

Next, the reset signal RST gets in an active state at time t51, and an area combining the first charge accumulation portion 66 and the second charge accumulation portion 67 is reset. Subsequently, at time t52 at which the reset signal RST gets in an inactive state, the potential of the combined area is output as a second reset level N2 to the vertical signal wire 17 through the amplification transistor 68 and the selection transistor 69.

After that, after time t53, the transfer signal FG, the transfer signal SG and the transfer signal CG are caused to get in an inactive state in this order, and the second transfer gate portion 63, a gate electrode 661 of the first charge accumulation portion 66 and the fifth transfer gate portion 73 are caused to get in a non-conduction state. By this means, the state returns to the initial state of time t41. The transfer signal FG, the transfer signal SG and the transfer signal CG are caused to get in an inactive state in this order, such that, when the gate electrode 661 of the first charge accumulation portion 66 is in a conduction state, channel charges accumulated in the substrate surface are accumulated in the second charge accumulation portion 67. Unlike the FD portion 71, the reset is not performed only by the second charge accumulation portion 67, and therefore there is no concern that an offset is caused in pixel signals by the reset of the channel charges.

Also, the load MOS transistor drive signal is turned on at time t46 and turned off at time t53. The load MOS transistor, e.g. the selection transistor 69, denotes a transistor that controls ON/OFF of the amplification transistor 68 (i.e. amplifier) arranged in the unit pixel 60, and, by driving (i.e. turning on) the load MOS transistor, converts charges accumulated in pixels into a voltage and outputs it to the column processing portion 13 as a signal.

By the above series of circuit operations, the first reset level N1 is output from the unit pixel 60 to the vertical signal wire 17 first, the first signal level S1 is output from the unit pixel 60 to the vertical signal wire 17 second, the second signal level S2 is output from the unit pixel 60 to the vertical signal wire 17 third, and the second reset level N2 is finally output from the unit pixel 60 to the vertical signal wire 17.

Also, in the CMOS image sensor 10 in FIG. 1, the reset level noise is removed in the column processing portion 13.

For example, by computing a difference between the signal level (i.e. first signal level) S1 of a unit pixel and the reset level N1 acquired in a state where the first charge accumulation portion 66 and the second charge accumulation portion 67 of the unit pixel are separated, it is possible to acquire a pixel signal SN1 from which the reset level noise is removed. Also, by computing a difference between the signal level (i.e. second signal level) S2 of a unit pixel and the reset level N2 acquired in a state where the first charge accumulation portion 66 and the second charge accumulation portion 67 of the unit pixel are combined (or connected), it is possible to acquire a pixel signal SN2 from which the reset level noise is removed.

Subsequently, for example, in the signal processing portion 18 in FIG. 1, one of SN1 and SN2 is selected as a pixel signal of the unit pixel, subjected to gain correction and output.

For example, in the inside of the signal processing portion 18, one of the pixel signal SN1 and the pixel signal SN2 is selected and output. For example, the pixel signal SN1 is selected and output in a case where the value of the pixel signal SN1 is less than a threshold set in advance, and, otherwise, the pixel signal SN2 is selected and output.

However, as described above, it is requested to read charges in a state where the first charge accumulation portion 66 and the second charge accumulation portion 67 are separated, and reads charges in a state where the first charge accumulation portion 66 and the second charge accumulation portion 67 are combined (or connected). That is, since accumulated charges are read twice from one unit pixel and a signal is output, power consumption in the column processing portion, especially, power consumption in the load MOS transistor increases. Thus, in the related art, there has been a problem that the power consumption increases by performing reading twice from one unit pixel.

Therefore, in the present disclosure, based on a signal value acquired as a result of reading charges (i.e. first reading) in a state where the first charge accumulation portion 66 and the second charge accumulation portion 67 are separated, it is determined whether to read charges (i.e. second reading) in a state where the first charge accumulation portion 66 and the charge accumulation portion 67 are combined (or connected). As described above, even if the second reading is not performed in all unit pixels, it is possible to acquire adequate pixel signals and, as a result, suppress the power consumption.

To be more specific, for example, in a case where a signal value (for example, first signal level S1) acquired as a result of the first reading is equal to or greater than a predetermined threshold set in advance, the second reading is performed. As described above, in the unit pixel 60, light charges at low illumination are accumulated in the first charge accumulation portion 66 and light charges at high illumination are accumulated in the second charge accumulation portion 67. Therefore, for example, in a case where the first signal level S1 is less than a predetermined threshold set in advance, it is assumed that light received in the unit pixel 60 is low illumination and reading charges are not requested in a state where the first charge accumulation portion 66 and the second charge accumulation portion 67 are combined.

Also, the decision as to whether the signal value acquired as a result of the first reading is equal to or greater than a predetermined threshold set in advance, is made by a threshold comparison circuit set inside the column processing portion 13. Subsequently, the system control portion 15 generates the timing signal corresponding to each unit pixels 60 based on the decision result supplied from the threshold comparison circuit. As described above, for example, regarding the unit pixel 60 in which a signal value less than the threshold is acquired by the first reading, the second reading is skipped.

For example, as illustrated in FIG. 5, the light charges of each unit pixel are read. FIG. 5 is a view for explaining processing of reading charges from unit pixels in the present disclosure. Also, it is assumed that each of rectangle frames illustrated in FIG. 5(a) to FIG. 5(d) represents a unit pixel and the numerical value illustrated in the frame represents a signal value acquired as a result of the first reading or a signal value acquired as a result of the second reading. Also, in this example, it is assumed that charges of the unit pixels 60 arranged in the row direction and column direction in the pixel array portion 11 are read on a row basis (i.e. four unit pixels in the horizontal direction in the figure).

Here, for ease of explanation, although four unit pixels 60 are arranged in the row direction in the pixel array portion 11, more pixels are actually arranged.

First, charges of each unit pixel 60 in the first row are read by the first reading. The charges read at this time correspond to the charges accumulated in the first charge accumulation portion 66. FIG. 5(a) indicates signal values (for example, first signal level S1) read at this time. In the example of the same figure, values of the first signal level S1 read from four unit pixels in the first row are "5," "3," "4" and "6."

For example, when the above threshold is set to "7," it follows that all the signal values acquired as a result of the first reading from the unit pixels 60 in the first row are less than the threshold. Therefore, as illustrated in FIG. 5(b), regarding the unit pixels 60 in the first row, the second reading is skipped. Also, in FIG. 5(b), by omitting numerical values in the frames of the first row, it is expressed that the second reading is skipped.

Next, charges of each of unit pixels 60 in the second row are read by the first reading. FIG. 5(c) illustrates signal values (for example, first signal level S1) read at this time. In the example of the same figure, values of the first signal level S1 read from four unit pixels in the second row are "7," "7," "9" and "3."

In the current case, part of the signal values acquired as a result of the first reading from the unit pixels 60 of the second row is equal to or greater than the threshold. That is, the values of the first signal level S1 read from the first, second and third unit pixels 60 from the left of the second row are equal to or greater than the threshold. Therefore, as illustrated in FIG. 5(d), regarding the unit pixels 60 of the second row, the second reading is performed. Charges read at this time correspond to charges accumulated in the capacity combining the first charge accumulation portion 66 and the second charge accumulation portion 67. In the example of the figure, values of the second signal level S2 read from the four unit pixels of the second row are "3," "3," "5" and "1."

Also, in this example, although the value of the first signal level S1 read from the fourth unit pixel 60 from the left of the second row is less than the threshold, the second reading is also performed for the fourth unit pixel 60.

Next, with reference to the flowchart in FIG. 6, a charge reading processing example supporting FIG. 5 will be explained.

In step S21, each unit pixel is reset.

In step S22, charges are accumulated. At this time, an exposure is started and charges are accumulated in the photodiode 61.

In step S23, a variable number N to specify a row in the pixel array portion 11 is initialized.

In step S24, the first reading is performed on the one-row unit pixels of the N-th row in the pixel array portion 11. At this time, for example, as described above with reference to FIG. 5(a), charges of the unit pixels 60 of the first row are read by the first reading.

In step S25, signals corresponding to the charges read in the processing in step S24 are subjected to A/D conversion and output. At this time, for example, signals output from each of the one-row unit pixels 60 are supplied to the column processing portion 13 through each of the vertical signal wires 17 and subjected to A/D conversion.

In step S26, it is decided whether there is at least one value equal to or greater than a threshold in the signals subjected to A/D conversion in the processing in step S25.

In step S26, when it is decided that there is no value equal to or greater than the threshold in the signals subjected to A/D conversion in the processing in step S25, the processing proceeds to step S29. As described above, for example, as described above with reference to FIG. 5(b), the second reading is skipped for the one-row unit pixels of the N-th row.

Here, the second reading skip is realized by turning off the selection signal SEL with respect to the unit pixels of the one row during a reading period of the second signal level S2 and the reset level N2. Alternatively, for example, it may be realized by turning off the load MOS transistor with respect to the unit pixels of the one row during the reading period of the second signal level S2 and the reset level N2.

In step S29, a value of the variable number N is incremented by one and the processing returns to step S24. Subsequently, in step S24, the first reading is performed for the one-row unit pixels of the (N+1)-th row of the pixel array portion 11. At this time, for example, as described above with reference to FIG. 5(c), charges of the unit pixels 60 of the second row are read by the first reading.

After that, processing in step S26 is performed through processing in step S25. In the current case, it is decided that there is at least one value equal to or greater than the threshold in the signals subjected to A/D conversion in the processing in step S25, and the processing proceeds to step S27.

In step S27, the second reading is performed for the one-row unit pixels of the (N+1)-th row in the pixel array portion 11. At this time, for example, as described above with reference to FIG. 5(d), charges of the unit pixels 60 of the second row are read by the second reading.

In step S28, signals corresponding to the charges read in the processing in step S27 are subjected to A/D conversion and output.

Thus, the charge reading processing supporting FIG. 5 is performed. As described above, for example, it is possible not to perform the second reading for each of the unit pixels 60 of the first row in FIG. 5, and therefore it is possible to suppress power consumption.

Meanwhile, in the example described above with reference to FIG. 5, a case has been explained where, when the second reading is performed for one-row unit pixels, the second reading is performed for a unit pixel in which a signal acquired by the first reading has a value less than a threshold. For example, in FIG. 5(c) and FIG. 5(d), although the value of the first signal level S1 read from the fourth unit pixel 60 from the left in the second row is less than the threshold, the second reading is performed even for the fourth unit pixel 60.

However, the second signal level S2 read from the fourth unit pixel 60 from the left in the second row may not denote a signal of high accuracy, and therefore a signal acquired as a result of the second reading of such a unit pixel 60 may not be output to the column processing portion 13.

For example, charges of unit pixels may be read as illustrated in FIG. 7. FIG. 7 is a view for explaining another processing example of reading charges from unit pixels in the present disclosure. Also, similar to the case of FIG. 5, it is assumed that each of rectangle frames illustrated in FIG. 7(a) to FIG. 7(d) represents a unit pixel and the numerical value illustrated in the frame represents a signal value acquired as a result of the first reading or a signal value acquired as a result of the second reading. Also, in this example, it is assumed that charges of the unit pixels 60 arranged in the row direction and column direction in the pixel array portion 11 are read on a row basis (i.e. four unit pixels in the horizontal direction in the figure). Also, similar to the case of FIG. 5, an explanation will be given with an assumption that the threshold is set to 7.

FIG. 7(a) to FIG. 7(b) are similar to the cases of FIG. 5(a) and FIG. 5(b) and therefore their specific explanation will be omitted.

After the second reading is skipped in the same way as in FIG. 7(b), charges of the unit pixels 60 of the second row are read by the first reading. FIG. 7(c) represents signal values (for example, first signal level S1) read at this time. In the example of the same figure, values of the first signal level S1 read from four unit pixels in the second row are "7," "7," "9" and "3."

In the above case, part of the signal values acquired as a result of the first reading from the unit pixels 60 of the second row is equal to or greater than the threshold. That is, the values of the first signal level S1 read from the first, second and third unit pixels 60 from the left of the second row are equal to or greater than the threshold. Therefore, as illustrated in FIG. 7(d), regarding the unit pixels 60 of the second row, the second reading is performed. Charges read at this time correspond to charges accumulated in the capacity combining the first charge accumulation portion 66 and the second charge accumulation portion 67.

However, in the case of FIG. 7(d), unlike FIG. 5(d), the value of the second signal level S2 read from the fourth unit pixel 60 from the left of the second row is not described, which indicates that the second signal level S2 is not output from this unit pixel. This is because, in FIG. 7(c), the value of the first signal level S1 read from the fourth unit pixel 60 from the left of the second row is less than the threshold.

That is, in the example of FIG. 7(d), values of the second signal level S2 read from the unit pixels of the second row are "3," "3" and "5."

In the example of FIG. 7, for example, when the second reading is performed for the unit pixels 60 of the second row, the load MOS transistor of the fourth unit pixel 60 from the left is turned off. As described above, a signal acquired as a result of the second reading of the fourth unit pixel 60 from the left is not output to the column processing portion 13.

Next, with reference to the flowchart in FIG. 8, a charge reading processing example supporting FIG. 7 will be explained.

Figure 6:
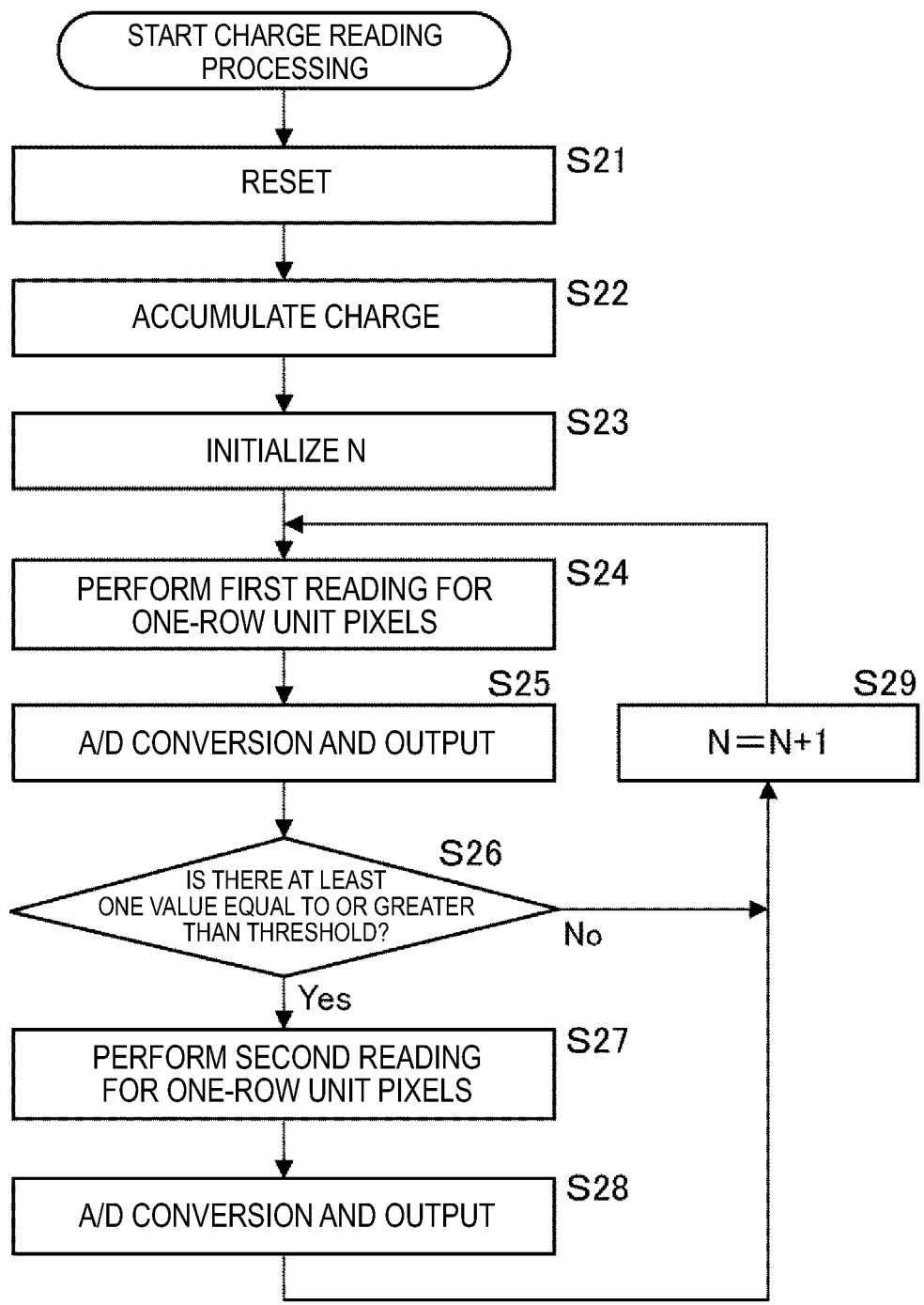
FIG. 6 is a flowchart for explaining an example of charge reading processing supporting FIG. 5.
Figure 8:
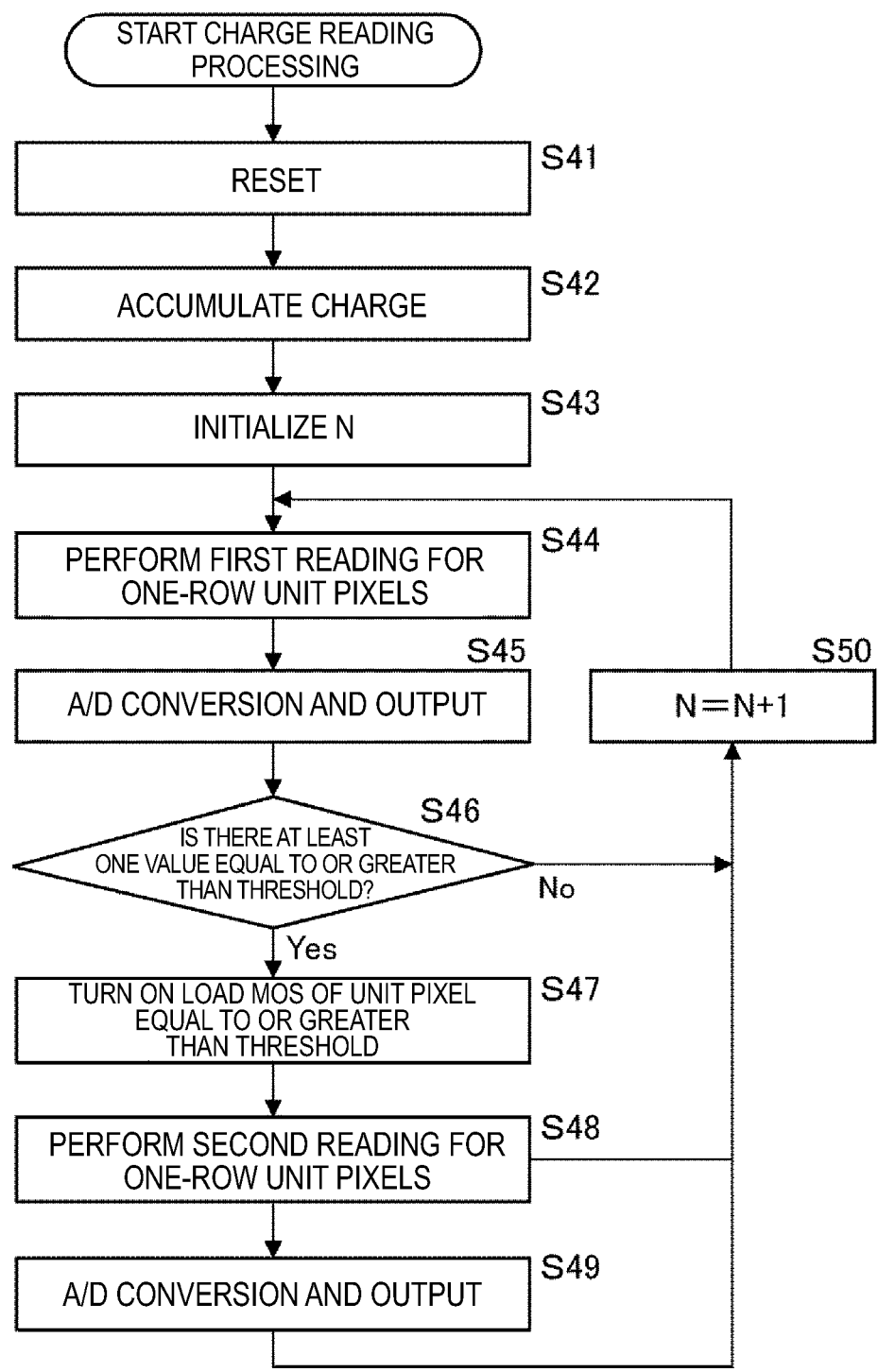
FIG. 8 is a flowchart for explaining an example of charge reading processing supporting FIG. 7.

Processing in steps S41 to S46 in FIG. 8 is similar to the processing in steps S21 to S26 in FIG. 6 and therefore specific explanation will be omitted. Also, processing in steps S49 and S50 in FIG. 8 is similar to the processing in steps S28 and S29 in FIG. 6 and therefore specific explanation will be omitted.

In step S46, when it is decided that there is at least one value equal to or greater than the threshold in the signals subjected to A/D conversion in the processing in step S45, and the processing proceeds to step S47.

In step S47, the load MOS transistor of the unit pixel, which outputs the signal decided to have the value equal to or greater than the threshold in the processing in step S46, is turned on. Also, the load MOS transistors of the other unit pixels are tuned off.

That is, for example, the load MOS transistors of unit pixels other than the fourth unit pixel 60 from the left of the second row in FIG. 7(c) are tuned on and the load MOS transistor of the fourth unit pixel 60 from the left is turned off.

In step S48, the second reading is performed for the one-row unit pixels of the pixel array portion 11. At this time, for example, as described above with reference to FIG. 7(d), charges of the unit pixels 60 of the second row are read by the second reading.

Thus, the charge reading processing supporting FIG. 7 is performed.

Also, in the example described above with reference to FIG. 7 and FIG. 8, for example, in the processing in step S47, it may be decided whether each of unit pixels have a value equal to or greater than a threshold, and it may be controlled such that the load MOS transistor is tuned on/off.

Figure 9:
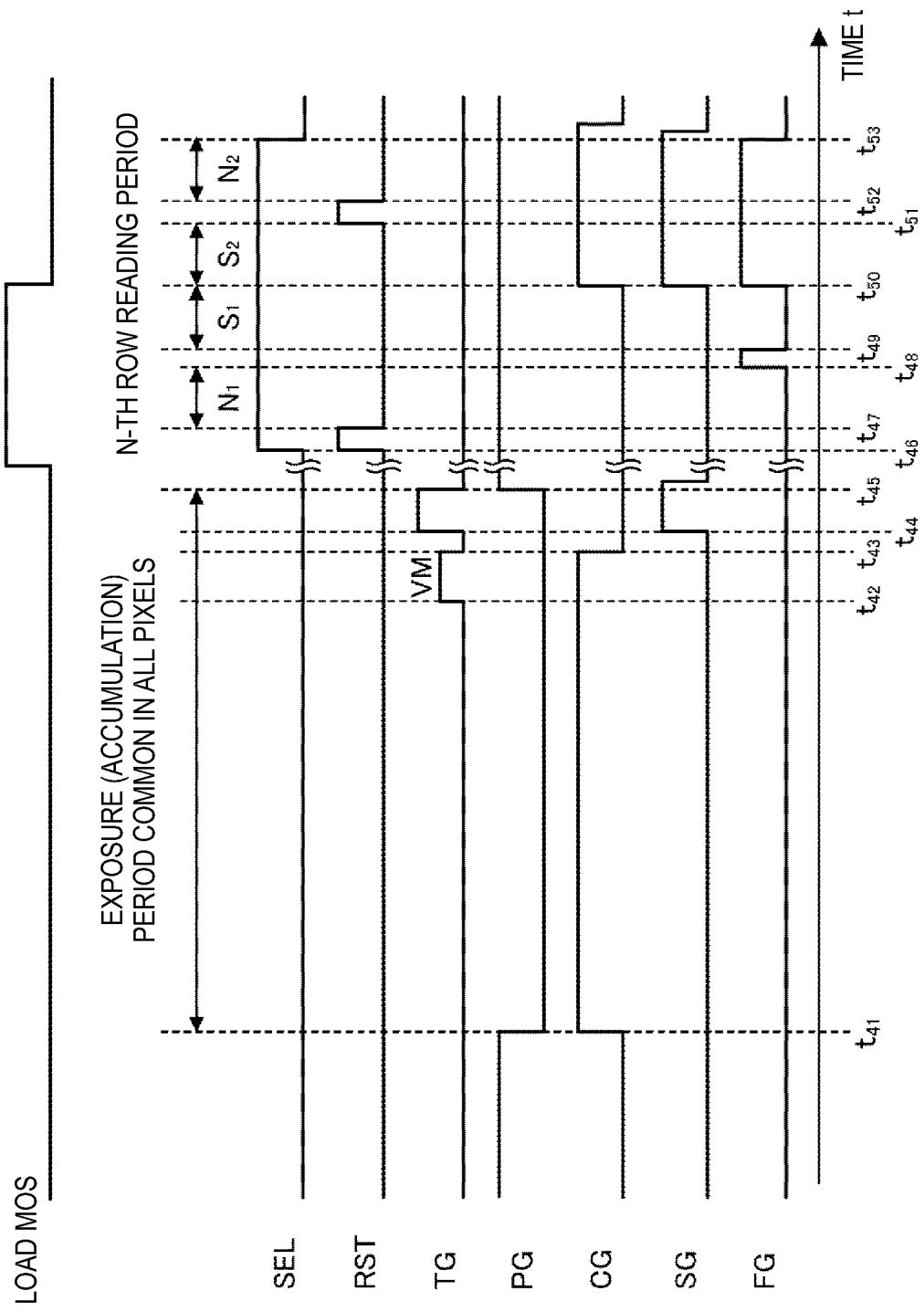
FIG. 9 is another timing chart for explaining circuit operations of the unit pixel in FIG. 3.
Figure 10:
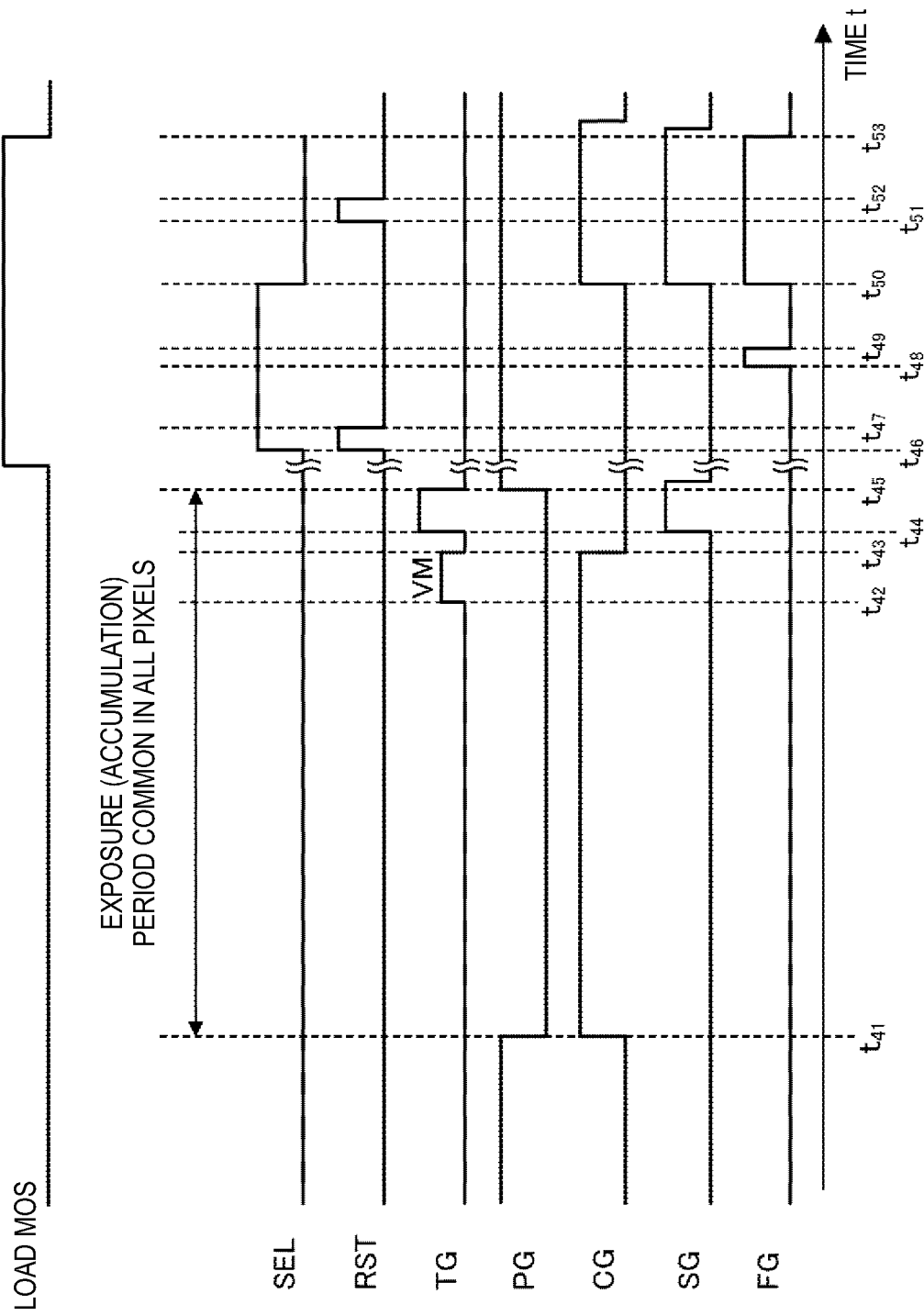
FIG. 10 is another timing chart for explaining circuit operations of the unit pixel in FIG. 3.

FIG. 9 and FIG. 10 illustrate other timing charts for explaining circuit operations of the unit pixel 60 in FIG. 3. The timing chart illustrated in FIG. 4 explains a case where the first reading and the second reading are performed for the unit pixel. By contrast with this, the timing charts illustrated in FIG. 9 and FIG. 10 explain a case where the first reading is performed for the unit pixel but the second reading is skipped for the unit pixel.

Similar to the case of FIG. 4, FIG. 9 and FIG. 10 illustrate the timing relationships of the selection signal SEL, the reset signal RST, the transfer signal TG, the charge ejection control signal PG, the transfer signal CG, the transfer signal SG and the transfer signal FG. Also, in addition to these signals, they illustrate the timing relationship of a load MOS transistor drive signal which will be described later.

In FIG. 9 and FIG. 10, the timing relationships of the reset signal RST, the transfer signal TG, the charge ejection control signal PG, the transfer signal CG, the transfer signal SG and the transfer signal FG are similar to those in the case of FIG. 4, and therefore their specific explanation will be omitted.

FIG. 9 is a timing chart in a case where the second reading is skipped by the load MOS transistor drive signal. As illustrated in the figure, the load MOS transistor drive signal turned on at time t46 is tuned off at time t50. As described above, although the first reading is performed for the unit pixel, it is possible to skip the second reading.

FIG. 10 illustrates a timing chart in a case where the second reading is skipped. As illustrated in the figure, the selection signal SEL turned on at time t46 is tuned off at time t50. As described above, although the first reading is performed for the unit pixel, it is possible to skip the second reading.

For example, when performing control as to whether to skip the second reading for each unit pixel, it is preferable to skip the second reading by the load MOS transistor drive signal as illustrated in FIG. 9.

Meanwhile, for example, when performing control as to whether to skip the second reading for one-row unit pixels arranged in the pixel array portion 11, it is preferable to skip the second reading by the selection signal SEL as illustrated in FIG. 10.

Meanwhile, examples have been explained in FIG. 5 to FIG. 8 where whether to skip the second reading for each unit pixel is checked every row. However, for example, it is possible to check whether to skip the second reading for each of one-frame unit pixels.

Figure 11:
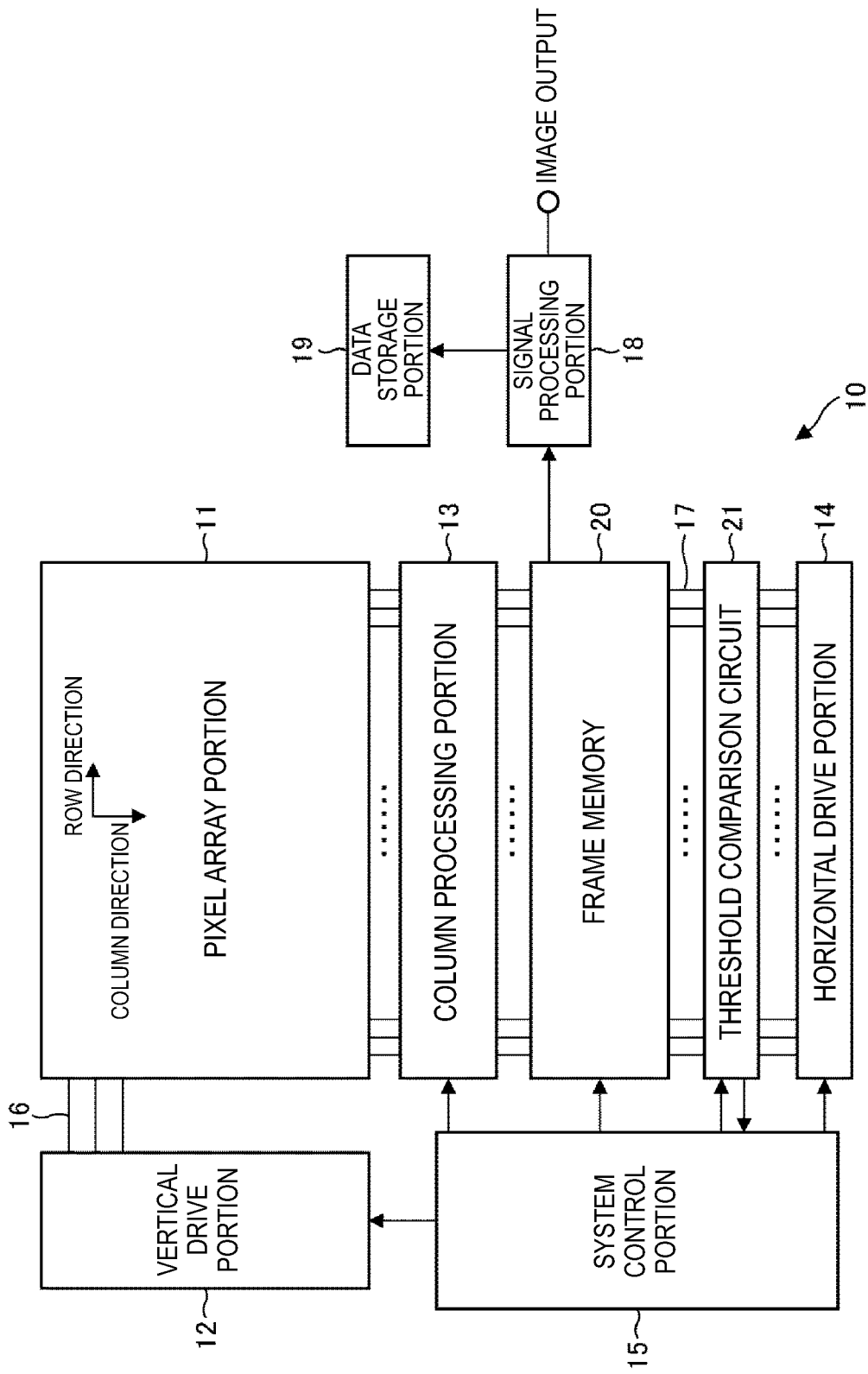
FIG. 11 is a block diagram illustrating a configuration example according to another embodiment of a CMOS image sensor to which the present disclosure is applied.

In this case, for example, the CMOS image sensor 10 may be configured as illustrated in FIG. 11. FIG. 11 is a view illustrating another configuration example of the CMOS image sensor 10 according to an embodiment of the present disclosure. FIG. 11 is a view supporting FIG. 1, and, in FIG. 11, the same reference numerals are assigned to the same function blocks as in FIG. 1.

In the case of a configuration in FIG. 11, unlike the case of FIG. 1, a frame memory 20 and a threshold comparison circuit 21 are set between the column processing portion 13 and the horizontal drive portion 14.

The frame memory 20 is configured to store a signal value acquired as a result of the first reading from each of one-frame unit pixels 60. Also, the one-frame unit pixels 60 generally denote all of the unit pixels 60 arranged in the pixel array portion 11. The frame memory 20 includes an address to specify the arrangement position in the row direction and column direction of each unit pixel 60 in the pixel array portion 11. Also, the signal value acquired from each unit pixel 60 is stored in association with the address corresponding to the arrangement position of the unit pixel 60.

The threshold comparison circuit 21 compares each signal value stored in the frame memory 20 with a threshold set in advance. Subsequently, the threshold comparison circuit 21 decides whether each signal value is equal to or greater than the threshold, and supplies the decision result to the system control portion 15. At this time, for example, the decision result is supplied to the system control portion 15 in association with the address of the frame memory in which the signal value is stored.

The system control portion 15 generates the timing signal corresponding to each unit pixel 60 based on the decision results supplied from the threshold comparison circuit 21. As described above, for example, regarding the unit pixel 60 in which a signal value acquired by the first reading is less than a threshold, the second reading is skipped.

The other configurations in FIG. 11 are similar to the case of FIG. 1 and therefore their specific explanation will be omitted.

Figure 12:
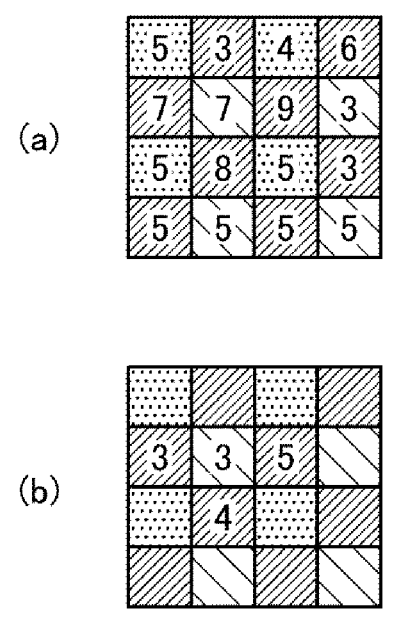

FIG. 12 is a view for explaining another processing example of reading charges from unit pixels in the present disclosure. For example, FIG. 12 explains processing of reading charges from unit pixels when checking whether to kip the second reading for each of one-frame unit pixels in a case where the CMOS image sensor 10 is configured as illustrated in FIG. 11.

Also, it is assumed that each of rectangle frames illustrated in FIG. 12(a) to FIG. 12(d) represents a unit pixel and the numerical value illustrated in the frame represents a signal value acquired as a result of the first reading or a signal value acquired as a result of the second reading. Here, for ease of explanation, it is assumed that one frame is formed with 16 (=4×4) unit pixels. Also, similar to the case of FIG. 5, an explanation will be given with an assumption that the threshold is set to 7.

In the case of an example in FIG. 12, by the first reading, charges are read from 16 unit pixels forming one frame. The charges read at this time correspond to the charges accumulated in the first charge accumulation portion 66. FIG. 12(a) indicates signal values (for example, first signal level S1) read at this time.

In the current case, values of the first signal level S1 read from unit pixels in the first to third columns from the left of the second row and the second row of the third row are equal to or greater than the threshold.

As described above, as illustrated in FIG. 12(b), the second reading is performed for unit pixels in the first to third columns of the second row and the second column of the third row, and the second reading is skipped for the other unit pixels. Also, whether to skip the second reading for each unit pixel is controlled by, for example, the load MOS transistor drive signal. For example, the load MOS transistor of a unit pixel from which a signal decided to be equal to or greater than the threshold is output is turned on, and the load MOS transistors of the other unit pixels are turned off.

In FIG. 12(b), signal values (for example, values of the second signal level S2) acquired as a result of the second reading are described only in the frames corresponding to the unit pixels in the first to third columns of the second row and the second column of the third row among sixteen frames. In the example of the figure, the values of the second signal level S2 read from these unit pixels are "3," "3," "5" and "4."

Figure 13:
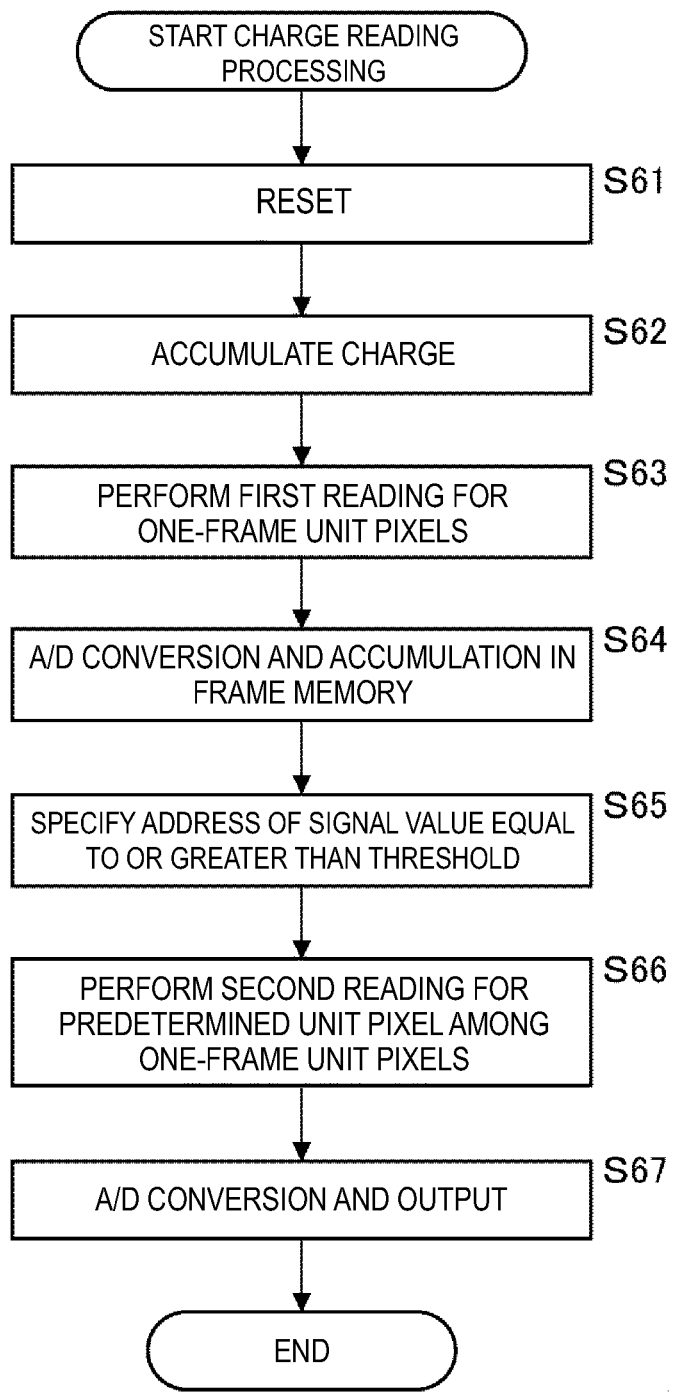
FIG. 13 is a flowchart for explaining an example of charge reading processing supporting FIG. 12.

Next, with reference to the flowchart in FIG. 13, a charge reading processing example supporting FIG. 12 will be explained.

In step S61, each unit pixel is reset.

In step S62, charges are accumulated. At this time, an exposure is started and charges are accumulated in the photodiode 61.

In step S63, the first reading is performed for one-frame unit pixels. At this time, for example, as described above with reference to FIG. 12(a), charges of the one-frame unit pixels 60 are read by the first reading.

In step S64, signals corresponding to the charges read in the processing in step S63 are subjected to A/D conversion in the column processing portion 13 and stored in respective addresses of the frame memory 20.

In step S65, among the signal values stored in the frame memory 20 by the processing in step S64, the address of a signal value equal to or greater than the threshold is specified.

At this time, by the threshold comparison circuit 21, the signal values stored in the frame memory 20 are compared with the threshold set in advance. Subsequently, the threshold comparison circuit 21 decides whether each signal value is equal to or greater than the threshold, and supplies the decision result to the system control portion 15. At this time, for example, the decision result is supplied to the system control portion 15 in association with the address of the frame memory in which the signal value is stored.

In step S66, the second reading is performed for a predetermined unit pixel among the one-frame unit pixels.

At this time, for example, as illustrated in FIG. 12(b), the second reading is performed for the unit pixels in the first to third columns of the second row and the second column of the third row, and the second reading is skipped for the other unit pixels.

In step S67, the signals read in the processing in step S66 are subjected to A/D conversion and output. Also, at this time, for example, regarding the unit pixels in the first to third columns of the second row and the second column of the third row, the signal values acquired by the second reading are subjected to A/D conversion and output, and, regarding the other unit pixels, the signal values stored in the frame memory 20 are output.

As described above, the charge reading processing supporting FIG. 12 is performed. As described above, for example, it is possible to prevent the second reading from being performed for twelve unit pixels among sixteen unit pixels of one frame in FIG. 12, and it is possible to suppress power consumption.

FIG. 14 is a view for explaining another processing example of reading charges from unit pixels in the present disclosure. Unlike the case of FIG. 12, the example of FIG. 14 explains processing of reading charges from unit pixels when checking whether to skip the second reading for each of one-block unit pixels. Here, the block is formed with unit pixels of a predetermined ratio among the unit pixels forming one frame. In this example, one block is formed with 4 (=2×2) unit pixels.

Also, similar to the case of FIG. 12, it is assumed that each of rectangle frames illustrated in FIG. 14(a) to FIG. 14(d) represents a unit pixel and the numerical value illustrated in the frame represents a signal value acquired as a result of the first reading or a signal value acquired as a result of the second reading. Here, for each of explanation, it is assumed that one frame is formed with 16 (=4×4) unit pixels. Also, similar to the case of FIG. 5, an explanation will be given with an assumption that the threshold is set to 7.

First, charges of sixteen unit pixels forming one frame are read by the first reading. The charges read at this time correspond to charges accumulated in the first charge accumulation portion 66, and signals corresponding to these charges are subjected to A/D conversion and stored in respective addresses of the frame memory 20.

Subsequently, the signal values (for example, the first signal level S1) stored in the frame memory 20 are compared with a predetermined threshold set in advance. Here, at this time, the threshold decision is performed on a block basis.

For example, as illustrated in FIG. 14(a), signal values of four unit pixels of the upper left block are subjected to threshold decision. In the current case, all of the signal values of four unit pixels of the upper left block are less than the threshold.

As described above, as illustrated in FIG. 14(b), the second reading is skipped for the four unit pixels of the upper left block. In FIG. 14(b), numerical values are not described in the four frames of the upper left block. Also, whether to skip the second reading for each unit pixel is controlled by, for example, the load MOS transistor drive signal.

Also, after the signal values of the four unit pixels of the upper left block are subjected to threshold decision, as illustrated in FIG. 14(c), signal values of four unit pixels of the lower left block are subjected to threshold decision. In the current case, signal values (in this example, "7" and "8") of two unit pixels among the signal values of the four unit pixels of the lower left block are equal to or greater than the threshold.

As described above, as illustrated in FIG. 14(d), the second reading is performed for the four unit pixels of the lower left block. In FIG. 14(d), signal values (for example, values of the second signal level S2) acquired as a result of the second reading are described in the four frames of the lower left block.

Also, in the case of this example, in the unit pixels in the block, when there is at least one signal value which is acquired by the first reading and which is equal to or greater than a threshold, the second reading is performed for the unit pixels in the block. Alternatively, for example, in a case where the average value of the signal values of the unit pixels in the block is equal to or greater than the threshold, the second reading may be performed for the unit pixels in the block.

Also, in addition to the frame memory 20, a block memory to store signal values acquired as a result of the first reading in four unit pixels forming a block may be set. In this case, in the block memory, it is decided whether there is at least one signal value equal to or greater than the threshold or whether the average value of the signal values of the unit pixels in the block is equal to or greater than the threshold.

Thus, whether to skip the second reading may be checked every block.

Also, this block may be a block related to, for example, white pixels. For example, in a CMOS image sensor used as a camera image pickup device, a white pixel is likely to be arranged in part of pixels to increase sensitivity. The white pixel denotes a pixel penetrating the whole visible wavelength band. In many cases, the white pixel is normally arranged in combination with R, G and B pixels.

For example, based on a reading result by the first reading of the white pixel, whether to perform the second reading for peripheral pixels may be decided. Since each unit pixel normally receives light of the color component of R, G or B and accumulates charges, the signal value may change by, for example, the same illumination or color. By contrast with this, since the white pixel includes so-called all-color components, by deciding whether to perform the second reading with reference to the white pixel, it is possible eliminate an influence due to colors and decide whether to perform the second reading.

FIG. 15 is a view for explaining another processing example of reading charges from unit pixels in the present disclosure. Similar to FIG. 14, FIG. 15 explains processing of reading charges from unit pixels when checking whether to skip the second reading for each of one-block unit pixels. However, in the current case, it is assumed that the block is formed with a predetermined number of unit pixels defined with reference to a unit pixel arranged as a white pixel among the unit pixels forming one frame. In this example, it is assumed that one block is formed with 4 (=2×2) unit pixels and the upper right unit pixel among the four unit pixels in the block is a white pixel.

First, charges of sixteen unit pixels forming one frame are read by the first reading. The charges read at this time correspond to charges accumulated in the first charge accumulation portion 66, and signals corresponding to these charges are subjected to A/D conversion and stored in respective addresses of the block memory.

Subsequently, each of the signal values of the white pixel among the signal values (for example, the first signal level S1) stored in the block memory is compared with a predetermined threshold set in advance.

For example, as illustrated in FIG. 15(a), a signal value of the white pixel among signal values of four unit pixels of the upper left block is subjected to threshold decision. In the current case, the signal value ("3") of the white pixel (in the upper right frame) of the upper left block is less than the threshold.

As described above, as illustrated in FIG. 15(b), the second reading is skipped for the four unit pixels of the upper left block. In FIG. 15(b), numerical values are not described in the four frames of the upper left block. Also, whether to skip the second reading for each unit pixel is controlled by, for example, the load MOS transistor drive signal.

In the current case, among the signal values of the four unit pixels of the upper left block, although the lower-right signal value ("7") is not less than the threshold, since the signal value of the white pixel in the block is less than the threshold, the second reading is skipped.

Also, after the signal value of the white pixel of the upper left block is subjected to threshold decision, as illustrated in FIG. 15(c), a signal value of the white pixel among signal values of the four unit pixels of the lower left block is subjected to threshold decision. In the current case, the signal value ("8") of the white pixel (in the upper right frame) of the lower left block is not less than the threshold.

As described above, as illustrated in FIG. 15(d), the second reading is performed for the four unit pixels of the lower left block. In FIG. 15(d), signal values (for example, values of the second signal level S2) acquired as a result of the second reading are described in the four frames of the lower left block. Also, in the case of this example, in a case where a signal value acquired as a result of the first reading of the white pixel in the block is equal to or greater than the threshold, the second reading is performed for all unit pixels in the block.

As described above, for example, it is possible to prevent the second reading from being performed for the unit pixels 60 in the upper left block in FIG. 15, and it is possible to suppress power consumption. Also, the block is formed with reference to a white pixel such that the second reading is controlled based on a signal value of the white pixel having the highest sensitivity in the block, and therefore it is possible to control the second reading more adequately.

Figure 16:
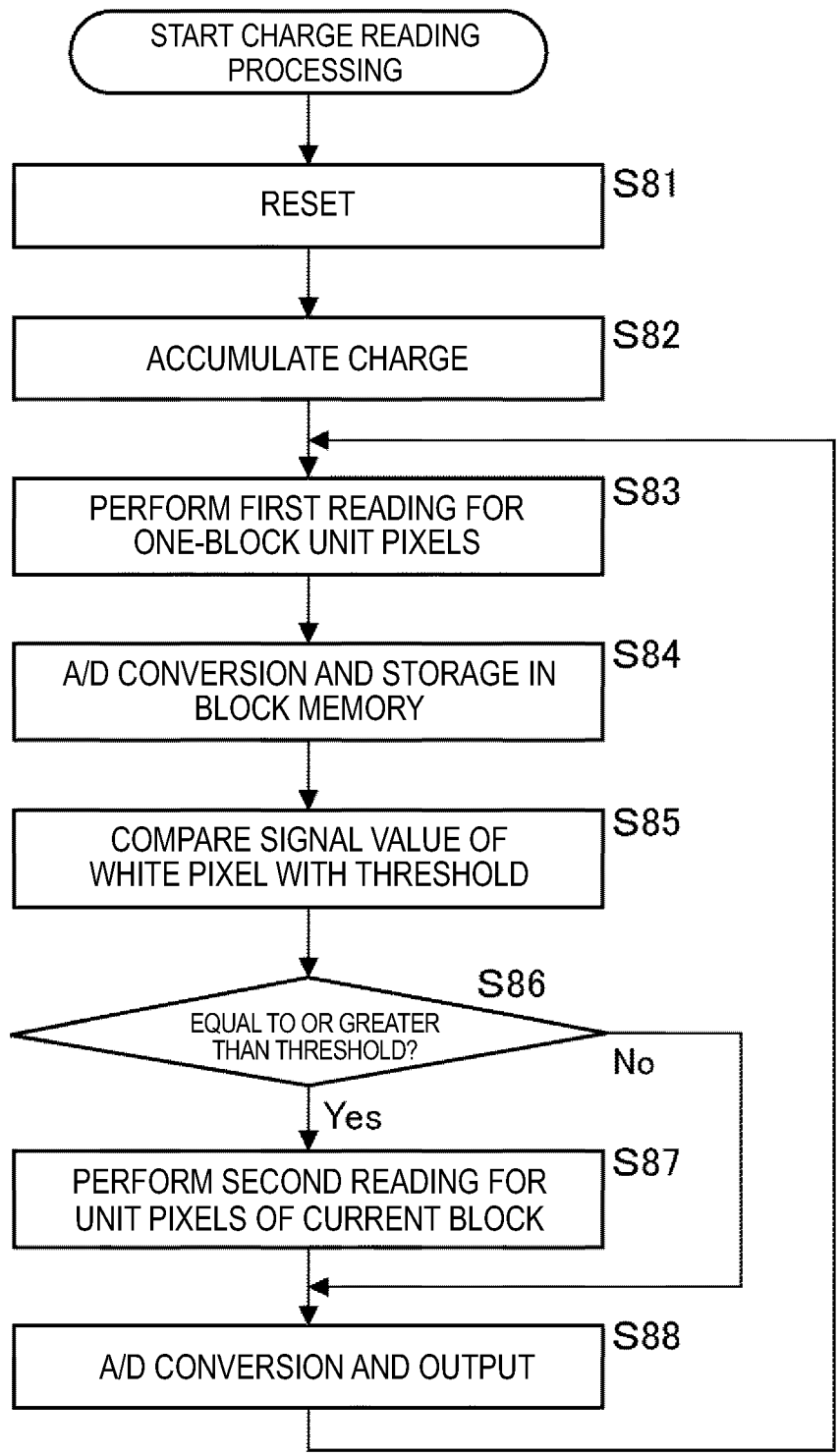
FIG. 16 is a flowchart for explaining an example of charge reading processing supporting FIG. 15.

Next, with reference to the flowchart in FIG. 16, a charge reading processing example supporting FIG. 15 will be explained.

In step S81, each unit pixel is reset.

In step S82, charges are accumulated. At this time, an exposure is started and charges are accumulated in the photodiode 61.

In step S83, the first reading is performed for one-block unit pixels. At this time, for example, as described above with reference to FIG. 15(a) or FIG. 15(c), charges of the one-block unit pixels 60 are read by the first reading.

In step S84, signals corresponding to the charges read in the processing in step S83 are subjected to A/D conversion in the column processing portion 13 and stored in respective addresses of the block memory.

In step S85, among the signal values stored in the block memory by the processing in step S84, the signal value of the white pixel is compared with the threshold.

In step S86, as a result of the comparison in step S85, it is decided whether the signal value of the white pixel is equal to or greater than the threshold. In step S86, when it is decided that the signal value of the white pixel is equal to or greater than the threshold, the processing proceeds to step S87.

In step S87, the second reading is performed for the unit pixels of the block.

At this time, for example, as illustrated in FIG. 15(d), the second reading is performed for the unit pixels of the block.

Subsequently, in step S88, the signals read in the processing in step S87 are subjected to A/D conversion and output.

Meanwhile, as a result of the comparison in step S85, when it is decided in step S86 that the signal value of the white pixel is not equal to or greater than the threshold, the processing in step S87 is skipped. At this time, for example, as illustrated in FIG. 15(b), the second reading is skipped for the unit pixels of the block.

In this case, in step S88, the signal values stored in the block memory by the processing in step S84 are output.

Thus, charge reading processing supporting FIG. 15 is performed. As described above, for example, it is possible to prevent the second reading from being performed for the unit pixels of the upper left block in FIG. 15, and it is possible to suppress power consumption.

Here, although FIG. 15 explains an example where the first reading is performed every block formed with four unit pixels with reference to a white pixel, for example, the first reading may be performed for one-frame white pixels first. Subsequently, signal values acquired as a result of the first reading of the white pixels may be stored in a memory and subjected to threshold decision to specify, based on the decision result, a block in which the second reading is skipped.

That is, after the first reading is performed only for the one-frame white pixels, the first reading and the second reading are performed for all one-frame unit pixels. At this time, among the signal values of white pixels stored in the memory, the second reading is skipped for a block formed with peripheral unit pixels of a white pixel corresponding to a signal value decided to be less than the threshold, and the second reading is performed for the other unit pixels.

As described above, it is possible to prevent the second reading from being performed for the unit pixels of a predetermined block and it is possible to suppress power consumption.

Also, the present disclosure is not limitedly applied to a solid-state image pickup device such as a CMOS image sensor. That is, the present disclosure is applicable to the overall electronic device using a solid-state image pickup device as an image import portion (i.e. photoelectric conversion portion), such as an imaging device including a digital still camera and video camera, a portable terminal device having an imaging function and a copy machine using a solid-state image pickup device as an image reading portion. The solid-state image pickup device may be formed as one chip or formed in a module format including an imaging function collectively packaging an imaging portion and a signal processing portion or optical system.

Figure 17:
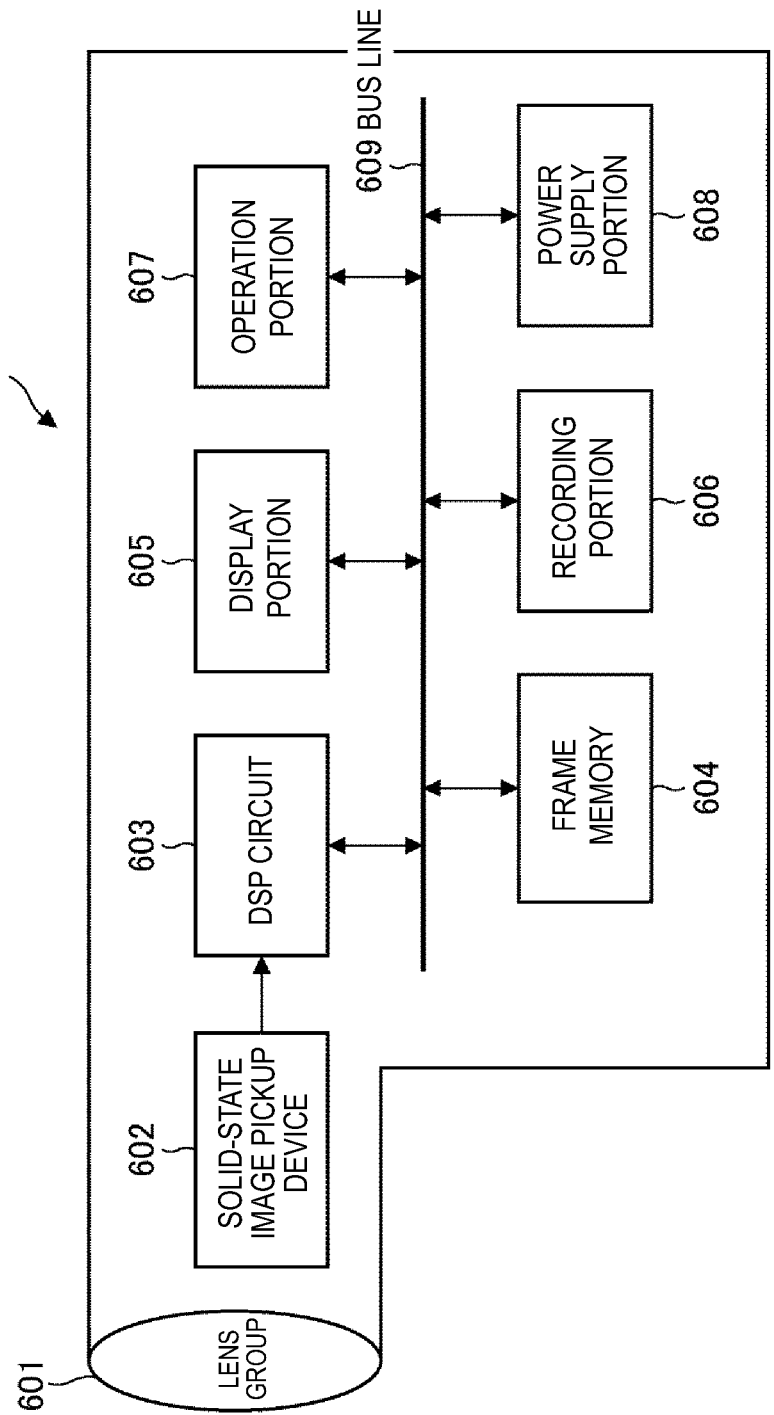
FIG. 17 is a view illustrating a configuration example according to an embodiment of an electronic device to which the present disclosure is applied.

FIG. 17 is a block diagram illustrating a configuration example of an imaging device as an electronic device to which the present disclosure is applied.

An imaging device 600 in FIG. 17 includes an optical portion 601 formed with a lens group, a solid-state image pickup device (i.e. imaging device) 602 adopting each configuration of the above pixel 2, and a DSP circuit 603 as a camera signal processing circuit. Further, the imaging device 600 includes a frame memory 604, a display portion 605, a recording portion 606, an operation portion 607 and a power supply portion 608. The DSP circuit 603, the frame memory 604, the display portion 605, the recording portion 606, the operation portion 607 and the power supply portion 608 are connected to each other via a bus line 609.

The optical portion 601 receives incident light (or image light) from a subject and forms an image on the imaging surface of the solid-state image pickup device 602. The solid-state image pickup device 602 converts the light quantity of incident light formed on the imaging surface by the optical portion 601 into electric signals in a pixel unit and output as pixel signals. As this solid-state image pickup device 602, it is possible to use a solid-state image pickup device such as the CMOS image sensor 10 according to the above embodiment, that is, a solid-state image pickup device that can realize an imaging without distortion by global exposure.

The display portion 605 includes, for example, a panel-type display device such as a liquid crystal panel and an organic EL (Electro Luminescence) panel, and displays a motion picture or still picture taken in the solid-state image pickup device 602. The recording portion 606 records the motion picture or still picture taken in the solid-state image pickup device 602, in a storage medium such as a videotape and a DVD (Digital Versatile Disk).

The operation portion 607 issues operation instructions with respect to various functions held in the imaging device 600 under the operation of a user. The power supply portion 608 adequately supplies various powers corresponding to operation powers of the DSP circuit 603, the frame memory 604, the display portion 605, the recording portion 606 and the operation portion 607 to these supply targets.

As described above, by using the CMOS image sensor 10 according to the above embodiment as the solid-state image pickup device 602, since it is possible to accurately remove reset noise without adding signals even when extracting a first pixel signal and extracting a second pixel signal, it is possible to realize high image quality of taken images in the imaging device 600 such as a video camera, a digital still camera and a camera module for mobile devices including a mobile phone.

Also, with an example, the above embodiment has described a case where the present disclosure is applied to a CMOS image sensor in which unit pixels to detect signal charges based on visible light amounts as physical amounts are arranged in a matrix manner. However, the present disclosure is not limitedly applied to the CMOS image sensor and is applicable to all solid-state image pickup devices of a column scheme in which a column processing portion is arranged every pixel column of a pixel array portion.

Also, the present disclosure is not limitedly applied to a solid-state image pickup device that detects distribution of incident quantities of visible light and photographs it as an image, and is generally applicable to a solid-state image pickup device that photographs distribution of incident quantities of infrared ray, X-ray or grain as an image, or solid-state image pickup devices (e.g. physical amount distribution detection device) such as a fingerprint detection sensor that detects distribution of other physical amounts such as pressure and capacitance in the broad sense of the term and photographs it as an image.

Also, the above series of processing described in the present specification may be performed in a time-series manner along the described order or, instead of not being performed in a time-series manner, may be performed in a parallel or individual manner.

Further, an embodiment of the present disclosure is not limited to the above embodiment and various changes can be made without departing from the gist of the present disclosure.

Additionally, the present technology may also be configured as below.

(1) A solid-state image pickup device including:

a pixel area in which a plurality of pixels are arranged, wherein the plurality of pixels include an accumulation section accumulating a charge acquired by photoelectric conversion, a plurality of detection sections detecting the charge accumulated in the accumulation section, a connection separation control section controlling connection or separation of the plurality of detection sections, an output section outputting a first signal corresponding to a potential of each detection section in a separation state in which the connection separation control section separates the plurality of detection sections, or outputting a second signal corresponding to a potential of each detection section in a connection state in which the connection separation control section connects the plurality of detection sections, and an output selection section selecting whether to output the first signal from the output section or output the second signal from the output section, based on a value of the first signal.

(2) The solid-state image pickup device according to (1), wherein the first signal is output at low illumination and the second signal is output at high illumination.

(3) The solid-state image pickup device according to (1) or (2), wherein, when the value of the first signal is equal to or greater than a threshold set in advance, the output selection section selects to output the second signal from the output section.

(4) The solid-state image pickup device according to any one of (1) to (3), wherein the output selection section selects whether to output the first signal or output the second signal, by controlling ON/OFF of a load MOS transistor of each pixel.

(5) The solid-state image pickup device according to any one of (1) to (3), wherein the output selection section selects whether to output the first signal or output the second signal, by controlling ON/OFF of a selection transistor of each pixel.

(6) The solid-state image pickup device according to any one of (1) to (5), wherein, for each of the plurality of pixels arranged in a two-dimensional matrix manner in the pixel area, whether to output the first signal or output the second signal is selected on a per-row basis.

(7) The solid-state image pickup device according to any one of (1) to (6), further including:

a memory storing the first signal value acquired from each of the plurality of pixels arranged in the pixel area, wherein the selection section selects whether to output the first signal or output the second signal, from the output section of each pixel, based on the first signal value of each pixel stored in the memory.

(8) The solid-state image pickup device according to any one of (1) to (6), further including:
a memory storing the first signal value acquired from a pixel arranged as a white pixel among the plurality of pixels arranged in the pixel area,
wherein the selection section selects whether to output the first signal or output the second signal, from the output section of each pixel in a predetermined area including the white pixel, based on the first signal value of each pixel stored in the memory.

(9) A method for driving a solid-state image pickup device, the solid-state image pickup device including
a pixel area in which a plurality of pixels are arranged, wherein
the plurality of pixels include
an accumulation section accumulating a charge acquired by photoelectric conversion,
a plurality of detection sections detecting the charge accumulated in the accumulation section,
a connection separation control section controlling connection or separation of the plurality of detection sections,
an output section outputting a first signal corresponding to a potential of each detection section in a separation state in which the connection separation control section separates the plurality of detection sections, or outputting a second signal corresponding to a potential of each detection section in a connection state in which the connection separation control section connects the plurality of detection sections, and
an output selection section selecting whether to output the first signal from the output section or output the second signal from the output section, based on a value of the first signal, the method comprising:
comparing the value of the first signal with a threshold set in advance; and
outputting, when the value of the first signal is equal to or greater than the threshold set in advance, the second signal from the output section.

(10) An electronic device including:
a solid-state image pickup device including a pixel area in which a plurality of pixels are arranged, wherein
the plurality of pixels include
an accumulation section accumulating a charge acquired by photoelectric conversion,
a plurality of detection sections detecting the charge accumulated in the accumulation section,
a connection separation control section controlling connection or separation of the plurality of detection sections,
an output section outputting a first signal corresponding to a potential of each detection section in a separation state in which the connection separation control section separates the plurality of detection sections, or outputting a second signal corresponding to a potential of the detection section in a connection state in which the connection separation control section connects the plurality of detection sections, and
an output selection section selecting whether to output the first signal from the output section or output the second signal from the output section, based on a value of the first signal.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-019826 filed in the Japan Patent Office on Feb. 1, 2012, the entire content of which is hereby incorporated by reference.

What is claimed is:

1. A solid-state image pickup device comprising:
unit pixels configured to photo-electrically convert light into charges and convert the charges into analog signals; and
circuitry configured to perform a first reading of a plurality of the analog signals from a block of the unit pixels and convert the plurality of the analog signals from the block of the unit pixels into a plurality of digital signals,
wherein the circuitry is configured to perform a second reading of another plurality of the analog signals from the block of the unit pixels in case that the circuitry determines that an average value for any of the plurality of digital signals is greater than a predetermined value of a threshold.

2. The solid-state image pickup device according to claim 1, wherein the circuitry is configured to compare the plurality of digital signals with the predetermined value of the threshold.

3. The solid-state image pickup device according to claim 1, wherein the block of the unit pixels includes a predetermined ratio of unit pixels among the unit pixels forming a frame.

4. The solid-state image pickup device according to claim 1, wherein one of the unit pixels in the block of the unit pixels is configured to output one of the plurality of the analog signals and another of the unit pixels in the block of the unit pixels is configured to output another of the plurality of the analog signals.

5. The solid-state image pickup device according to claim 1, wherein the second reading of one of said another plurality of the analog signals from one of the unit pixels in the block of the unit pixels is permitted when the average value of the plurality of digital signals is greater than the predetermined value of the threshold.

6. The solid-state image pickup device according to claim 1, wherein the circuitry is configured to convert one of the plurality of the analog signals into one of the plurality of digital signals.

7. The solid-state image pickup device according to claim 1, wherein the second reading of another of said another plurality of the analog signals from another of the unit pixels in the block of the unit pixels is permitted when the average value of the plurality of digital signals is greater than the predetermined value of the threshold.

8. The solid-state image pickup device according to claim 7, wherein the circuitry is configured to convert said another of said another plurality of the analog signals into another of the plurality of digital signals.

9. An electronic device comprising:
the solid-state image pickup device comprising:
unit pixels configured to photo-electrically convert light into charges and convert the charges into analog signals; and
circuitry configured to perform a first reading of a plurality of the analog signals from a block of the unit pixels and convert the plurality of the analog signals from the block of the unit pixels into a plurality of digital signals,
wherein the circuitry is configured to perform a second reading of another plurality of the analog signals from the block of the unit pixels in case that the circuitry determines that an average value of the plurality of digital signals is greater than a predetermined value of a threshold; and an optical portion that receives the light from a subject and forms an image on an imaging surface of the solid-state image pickup device.

10. A method for driving a solid-state image pickup device, the method, performed in the solid-state image pickup device, comprising:

a step (a) of setting a threshold to a predetermined value;

a step (b) of converting light into charges photo-electrically and converting the charges into analog signals in unit pixels;

a step (c) of performing a first reading of a plurality of the analog signals from a block of the unit pixels;

a step (d) of converting the plurality of the analog signals from the block of the unit pixels into a plurality of digital signals;

a step (e) of comparing the plurality of digital signals with the predetermined value of the threshold; and a step (f) of performing a second reading of another plurality of the analog signals from the block of the unit pixels in case that it is determined in the step (e) that an average value of the plurality of digital signals is greater than the predetermined value of the threshold.

11. The method according to claim 10, further comprising:
a step (f-1) of converting said another plurality of the analog signals from the block of the unit pixels into another plurality of digital signals, the step (f) being performed before the step (f-1).

12. The method according to claim 10, wherein the block of the unit pixels includes a predetermined ratio of unit pixels among the unit pixels forming a frame.

13. The method according to claim 10, further comprising:
a step of performing a first reading of a plurality of analog signals from another block of the unit pixels adjacent to the block of the unit pixels.

14. The method according to claim 10, further comprising:
a step of repeating the step (c) through the step (f) for another block of the unit pixels adjacent to the block of the unit pixels.

15. The method according to claim 10, wherein the step of performing a first reading of a plurality of analog signals from another block of the unit pixels is performed after the step (e) when it is determined in the step (e) that the average value of the plurality of digital signals from the block of the unit pixels is not greater than the predetermined value of the threshold.

16. The method according to claim 10, wherein the step of performing a first reading of a plurality of analog signals from another block of the unit pixels is performed after the step (f) when it is determined in the step (e) that the average value of the plurality of digital signals from the block of the unit pixels is greater than the predetermined value of the threshold.

17. The method according to claim 10, wherein the second reading is performed on one of the unit pixels in the block of the unit pixels during the step (f), said one of the unit pixels outputting one of said another plurality of the analog signals.

18. The method according to claim 10, wherein said one of the plurality of the analog signals is converted into one of the plurality of digital signals during the step (d), the average value of the plurality of digital signals being greater than the predetermined value of the threshold.

19. The method according to claim 10, wherein the second reading is not performed on another of the unit pixels in the block of the unit pixels during the step (f), said another of the unit pixels outputting another of the plurality of the analog signals.

* * * * *